(12) United States Patent
Okada

(10) Patent No.: US 10,850,195 B2
(45) Date of Patent: Dec. 1, 2020

(54) POSITIONAL RELEASING OF GAME CONTENT DIFFICULTY LEVELS

(71) Applicant: SQUARE ENIX CO., LTD., Tokyo (JP)

(72) Inventor: Takuya Okada, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 16/138,235

(22) Filed: Sep. 21, 2018

(65) Prior Publication Data

US 2019/0160375 A1    May 30, 2019

(30) Foreign Application Priority Data

Nov. 28, 2017  (JP) .................................. 2017-227343

(51) Int. Cl.
| | | |
|---|---|---|
| *A63F 13/216* | (2014.01) | |
| *A63F 13/67* | (2014.01) | |
| *A63F 13/35* | (2014.01) | |

(52) U.S. Cl.
CPC ............ *A63F 13/35* (2014.09); *A63F 13/216* (2014.09); *A63F 13/67* (2014.09); *A63F 2300/53* (2013.01)

(58) Field of Classification Search
CPC ....................................................... A63F 9/24
See application file for complete search history.

(56) References Cited

U.S. PATENT DOCUMENTS

| | | | | |
|---|---|---|---|---|
| 2002/0100040 A1* | 7/2002 | Bull | ........................ | G07F 17/32 725/24 |
| 2007/0021166 A1* | 1/2007 | Mattila | ................... | A63F 13/12 463/1 |

(Continued)

FOREIGN PATENT DOCUMENTS

| | | |
|---|---|---|
| JP | 2001-096069 | 4/2001 |
| JP | 2002-273034 | 9/2002 |

(Continued)

OTHER PUBLICATIONS

Decision of Final rejection dated Mar. 26, 2019 from Japan Patent Office (JPO) in Japanese Patent Appl. No. 2017-227343, and an English translation thereof.

(Continued)

*Primary Examiner* — Damon J Pierce
(74) *Attorney, Agent, or Firm* — Greenblum & Bernstein, P.L.C.

(57) ABSTRACT

Disclosed is a game program that makes a server device connected to a terminal device executing a game including a plurality of game contents with different difficulty levels through a communication network control progress of the game. The game program causes the server device to realize a determination function of, based on positional information of a real space of the terminal device acquired from the terminal device used by a user, determining establishment of a positional condition including that the terminal device is positioned or has been positioned in any of one or more predetermined areas, and a setting function of setting a game content with a difficulty level higher than a game content already set in an executable state in the terminal device or the user among the plurality of game contents in an executable state based on establishment of a release condition including the positional condition.

11 Claims, 18 Drawing Sheets

(56) References Cited

U.S. PATENT DOCUMENTS

| | | | |
|---|---|---|---|
| 2007/0060353 A1 | 3/2007 | Omori et al. | |
| 2012/0157197 A1* | 6/2012 | Watkins, Jr. ........... | G06Q 10/00 |
| | | | 463/30 |
| 2014/0141889 A1* | 5/2014 | Chowdhary ............ | A63F 13/12 |
| | | | 463/42 |
| 2014/0357356 A1* | 12/2014 | Horie ...................... | A63F 13/00 |
| | | | 463/31 |
| 2016/0027284 A1* | 1/2016 | Kamp .................. | G08B 21/182 |
| | | | 340/686.6 |
| 2018/0214338 A1* | 8/2018 | Alvarez .................. | A61B 3/08 |

FOREIGN PATENT DOCUMENTS

| | | |
|---|---|---|
| JP | 2007-068775 | 3/2007 |
| JP | 2014-144350 | 8/2014 |

OTHER PUBLICATIONS

Japanese Office Action issued for Japanese Patent Application No. 2017-227343 dated Oct. 30, 2018 along with a partial English translation thereof.

\* cited by examiner

FIG.17

USER DATA

| USER ID | USER NAME | OWNED ITEM | NUMBER OF STAMPS | EXECUTABLE STAGE | CLEAR STAGE | EXCLUSION TARGET | BINGO DATA | SECURED PRIVILEGE | ... |
|---|---|---|---|---|---|---|---|---|---|
| J01-001 | KEN | *** | 23 | ST10 | ST3 | *** | *** | *** | ... |
| J01-002 | *** | *** | 2 | ST2 | ST1 | *** | *** | *** | ... |
| J01-003 | *** | *** | 1 | ST1 | ST1 | *** | *** | *** | ... |
| *** | *** | *** | *** | *** | *** | *** | *** | *** | ... |
| *** | *** | *** | *** | *** | *** | *** | *** | *** | ... |
| *** | *** | *** | *** | *** | *** | *** | *** | *** | ... |
| *** | *** | *** | *** | *** | *** | *** | *** | *** | ... |
| *** | *** | *** | *** | *** | *** | *** | *** | *** | ... |

POSITIONAL RELEASING OF GAME CONTENT DIFFICULTY LEVELS

BACKGROUND OF THE INVENTION

1. Field of the Invention

At least one of embodiments of the invention relates to a game program (software) and the like for causing a server device to progress a game using positional information of a real space of a terminal device.

2. Description of Related Art

In a smart device (terminal device), such as a smartphone, it is possible to acquire positional information of a real space of the terminal device using a global positioning system (GPS) or the like. A video game (game) using the positional information is provided for the terminal device (for example, see JP-A-2002-273034).

SUMMARY OF THE INVENTION

In the configuration of the game using the positional information described above, in a case where a frequency that a user plays the game falls, there is a problem in that movement in the real space decreases.

An object of at least one embodiment of the invention is to solve the above-described problem, and is to provide a game program and the like that give a user motivation to visit even the same area of a real space any number of times while maintaining a play frequency of the user.

From a non-limiting point of view, according to an embodiment of the invention, there is provided a game program that makes a server device connected to a terminal device executing a game including a plurality of game contents with different difficulty levels through a communication network control progress of the game. The game program causes the server device to realize a determination function of determining, based on positional information of a real space of the terminal device acquired from the terminal device used by a user, establishment of a positional condition including that the terminal device is positioned or has been positioned in any of one or more predetermined areas, and a setting function of setting a game content with a difficulty level higher than a game content already set in an executable state in the terminal device or the user among the plurality of game contents in an executable state based on establishment of a release condition including the positional condition.

From a non-limiting point of view, according to another embodiment of the invention, there is provided a game program that makes a terminal device control progress of a game including a plurality of game contents with different difficulty levels. The game program causes the terminal device to realize an acquisition function of acquiring positional information of a real space, a determination function of determining, based on the positional information of the real space, establishment of a positional condition including that the terminal device is positioned or has been positioned in any of one or more predetermined areas, and a setting function of setting a game content with a difficulty level higher than a game content already set in an executable state among the plurality of game contents in an executable state based on establishment of a release condition including the positional condition.

From a non-limiting point of view, according to still another embodiment of the invention, there is provided a game system that includes a terminal device executing a game including a plurality of game contents with different difficulty levels and a server device connected to the terminal device through a communication network, and controls progress of the game. The game system includes an acquirer configured to acquire positional information of a real space of the terminal device used by the user, a determiner configured to determine, based on the positional information of the real space, establishment of a positional condition including that the terminal device is positioned or has been positioned in any of one or more predetermined areas, and a setter configured to set a game content with a difficulty level higher than a game content already set in an executable state in the terminal device or the user among the plurality of game contents in an executable state based on establishment of a release condition including the positional condition.

According to the respective embodiments of the present application, one or more problems are solved.

BRIEF DESCRIPTION OF THE DRAWINGS

FIG. 17 is a diagram showing an example of user data corresponding to at least one of the embodiment of the invention.

DESCRIPTION OF EMBODIMENTS

Figure 1:
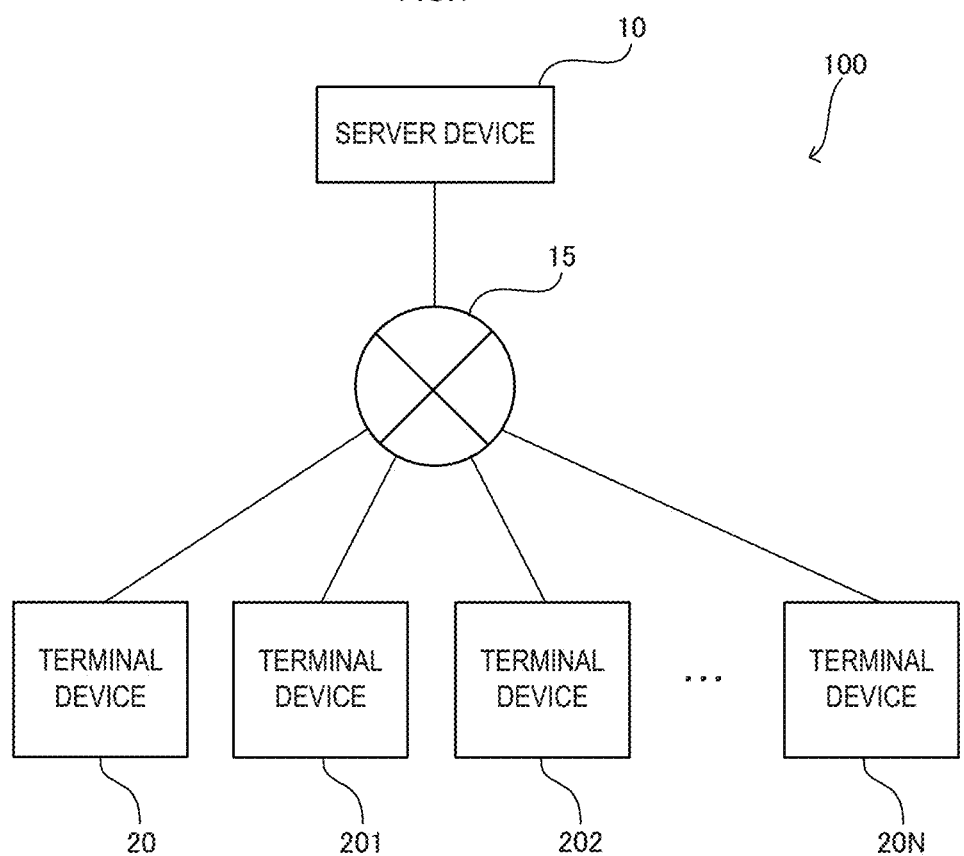
FIG. 1 is a block diagram showing an example of the configuration of a game system corresponding to at least one of embodiments of the invention.

Hereinafter, examples of embodiments of the invention will be described referring to the drawings. In the examples of the embodiments described below, various components may be appropriately combined with each other within a range without contradiction. The content described as an example of one embodiment may be omitted in another embodiment. Description of an operation and processing not related to a feature of each embodiment may be omitted. The order of various kinds of processing constituting various flows described below may be appropriately changed within a range without contradiction in processing content thereof.

First Embodiment

FIG. 1 is a block diagram showing an example of the configuration of a game system 100 according to an embodiment of the invention. As shown in FIG. 1, the game system 100 includes a server device 10 and terminal devices (game machines) 20 and 201 to 20N (where N is any integer) that are respectively used by a plurality of users (players) who play a video game (game). The server device 10 and the plurality of terminal devices 20 and 201 to 20N are respectively connected to a communication network 15, such as the Internet. The configuration of the game system 100 is not limited thereto, and for example, a configuration in which a plurality of users use a single terminal device may be made or a configuration in which a plurality of server devices are provided may be made.

The game system 100 has various functions for executing a game including a plurality of game contents with different difficulty levels. In the game of the example of the embodiment, in a case where a release condition is established, a game content with a difficulty level higher than a game content already set in an executable state is set in an executable state. The establishment of the release condition is determined for each of the users who use the terminal devices 20 and 201 to 20N. For example, in a case where the release condition is established for the user who uses the terminal device 20, a game content with a difficulty level higher than a game content already set in an executable state for the user among the plurality of game contents is set in an executable state for the user only.

The executable state means a state (a state in which execution is permitted) in which a game content is executable in the terminal devices 20 and 201 to 20N. For example, in the terminal device 20, in a case where the user performs a play start operation to a game content set in an executable state, the execution of the game content is started.

The release condition includes a positional condition. The positional condition includes that the terminal devices 20 and 201 to 20N used by the users are positioned in any of one or more predetermined areas. Accordingly, for example, the user moves to any predetermined area while carrying the terminal device 20 to use, whereby a game content with a higher difficulty level is set in an executable state. For this reason, the user moves toward the predetermined area in order to secure a game content with a higher difficulty level.

The server device 10 is managed by an administrator of the game system and has various functions for providing information relating to the progress of the game to the terminal devices 20 and 201 to 20N. In the example of the embodiment, the server device 10 provides setting information of execution permission or prohibition of the game content for the user, or the like. In the example of the embodiment, the server device 10 is constituted of an information processing device, such as a WWW server, in order to provide information relating to the progress of the video game, and includes a database (storage unit) that stores various kinds of information.

Figure 2:
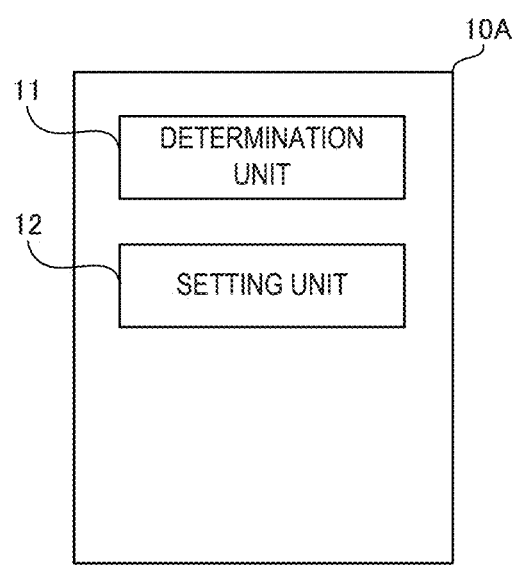
FIG. 2 is a functional block diagram showing an example of a server device corresponding to at least one of the embodiments of the invention.

FIG. 2 is a functional block diagram showing the configuration of a server device 10A that is an example of the configuration of the server device 10. While the server device 10A includes a storage unit, such as an HDD, a control unit constituted of a CPU, and the like (not shown), detailed description will be omitted. The server device 10A includes at least a determination unit 11 and a setting unit 12 when the control unit executes software (game program) for controlling the progress of the video game stored in the storage unit. It should be noted that game data is also included in the game program.

The determination unit 11 acquires positional information of a real space of the terminal devices 20 and 201 to 20N from the terminal devices 20 and 201 to 20N used by the users. The determination unit 11 determines establishment of a positional condition for each of the terminal devices 20 and 201 to 20N based on the positional information of the real space. That is, the determination unit 11 determines whether or not each of the terminal devices 20 and 201 to 20N is positioned in any of one or more predetermined area. The determination unit 11 performs determination, for example, by comparison of positional information of a predetermined area with the positional information of the real space. It should be noted that the positional information of the predetermined area may be stored in the storage unit of the server device 10A.

The setting unit 12 sets a game content with a difficulty level higher than a game content already set in an executable state among the plurality of game contents in an executable state for the user who satisfies the release condition. The setting unit 12 may perform the setting to user data including information relating to the game of the user, for example. Specifically, the setting unit 12 sets identification information of a game content in an executable state in user data. User data may be stored in the storage unit of the server device 10A for each user, for example.

Each of the terminal devices 20 and 201 to 20N is managed by the user who plays the game. The terminal devices 20 and 201 to 20N are constituted of, for example, terminal devices, such as personal computers, mobile phone terminals, personal digital assistants (PDA), or portable game machines, that are able to execute the video game.

While each of the terminal devices 20 and 201 to 20N includes a plurality of operation devices (operation units), a storage unit, such as an HDD, a control unit constituted of a CPU that executes the game to generate a game image, a display device (display unit) that displays the game image, a transmission and reception unit that performs communication with other devices, and the like, detailed description will be omitted. In the terminal devices 20 and 201 to 20N, software (game program) for executing the game by performing communication with the server device 10 is stored in the storage unit.

Figure 3:
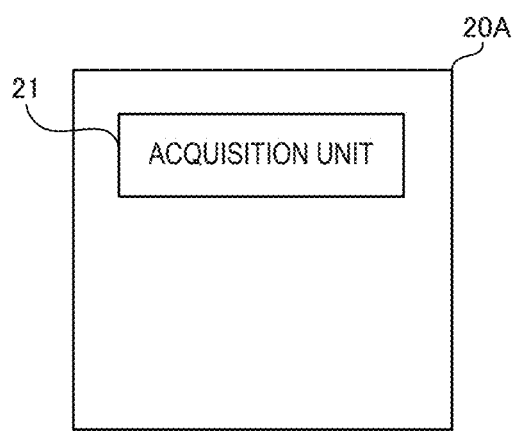
FIG. 3 is a functional block diagram showing an example of the configuration of a terminal device corresponding to at least one of the embodiments of the invention.

FIG. 3 is a functional block diagram showing the configuration of a terminal device 20A that is an example of the configuration of the terminal device 20. The terminal device 20A includes at least an acquisition unit 21, for example, when the control unit executes the game program. It should be noted that the terminal devices 201A to 20NA also have the same configuration. The acquisition unit 21 acquires positional information of a real space of the terminal device 20A.

Next, the operation of the game system 100 (system 100) of the embodiment will be described.

Figure 4:
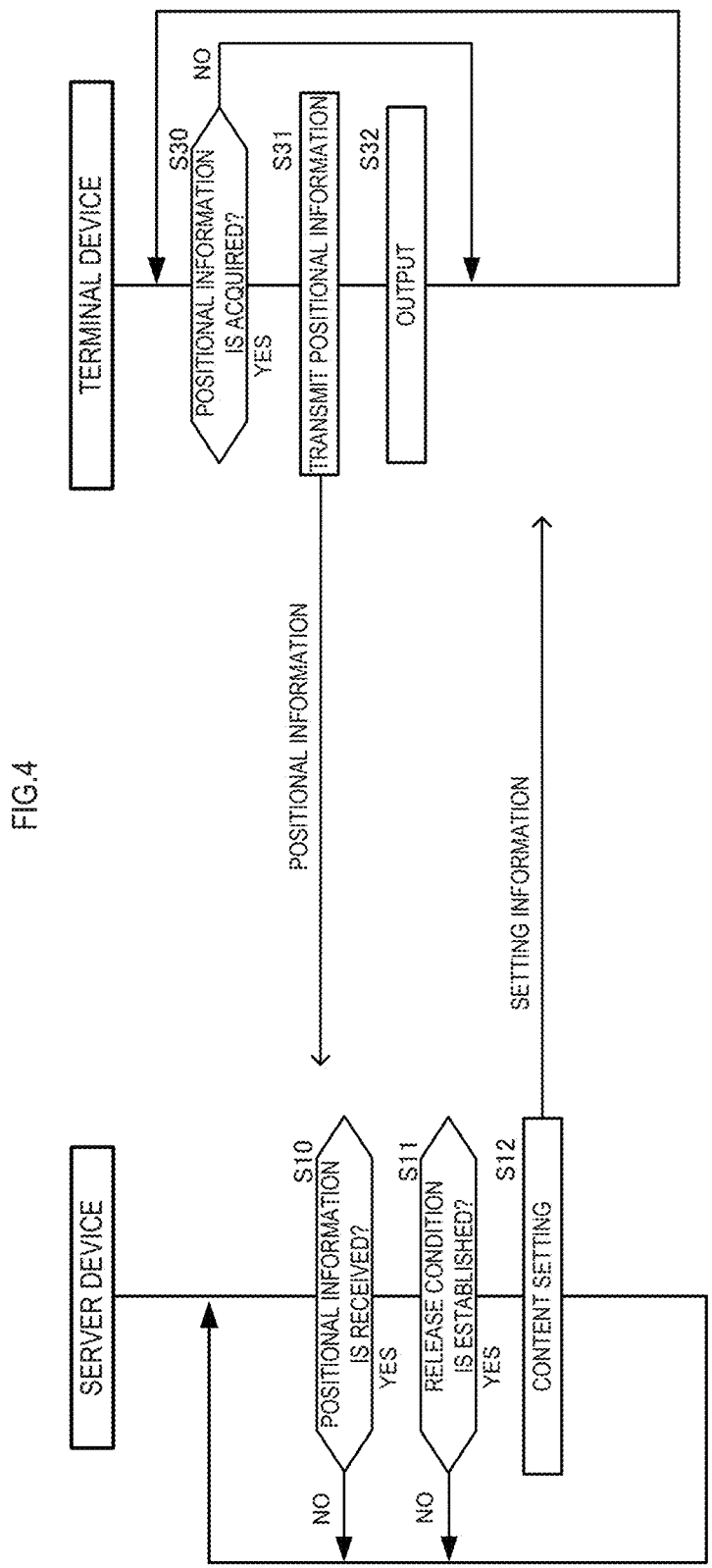
FIG. 4 is a flowchart showing an example of progress processing of a game corresponding to at least one of the embodiments of the invention.

FIG. 4 is a flowchart showing an example of progress processing of a game that the system 100 executes. In the progress processing in the example of the embodiment, processing for progressing a game including processing for setting a game content in an executable state is executed. It should be noted that, in FIG. 4, processing for setting a game content in an executable state will be primarily described, and a part of other processing will be omitted. Hereinafter, a case where the server device 10A and the terminal device 20A execute the progress processing will be described as an example.

The progress processing of example of the embodiment is executed, for example, during starting of the server device 10A and the terminal device 20A.

In the progress processing, the terminal device 20A determines whether or not the positional information of the real space is acquired (Step S30). In a case where the positional information is not acquired (Step S30: NO), the terminal device 20A returns to the processing of Step S30. In a case where the positional information is acquired (Step S30: YES), the terminal device 20A transmits the acquired positional information to the server device 10A (Step S31). It should be noted that the terminal device 20A also transmits identification information (user ID) of the user along with the acquired positional information.

The server device 10A determines whether or not the positional information of the real space is received (Step S10). In a case where the positional information is not received (Step S10: NO), the server device 10A returns to the processing of Step S10 again.

In a case where the positional information is received (Step S10: YES), the server device 10A determines whether or not the release condition is established (Step S11). For example, in a case where the release condition is only the positional condition, and in a case where the positional condition is established, determination is made that the release condition is established. As described above, the establishment of the positional condition is determined by comparison of the positional information of the predetermined area with the positional information of the real space of the terminal device 20A.

In a case where the release condition is not established (Step S11: NO), the server device 10A returns to the processing of Step S10. In a case where the release condition is established (Step S11: YES), the server device 10A executes content setting processing (Step S12). Specifically, the server device 10A sets a game content with a difficulty level higher than a game content already set in an executable state among a plurality of game contents in an executable state for the user who uses the terminal device 20A. For example, the server device 10A performs the setting to user data of the user as described above.

The server device 10A transmits setting information of the game content set in the executable state to the terminal device 20A. The terminal device 20A displays a game image based on the setting information of the game content received from the server device 10A on the display unit (Step S32). For example, the game image is displayed such that the user can specify the game content executable at present. Thereafter, the terminal device 20A returns to the processing of Step S30.

As described above, as an aspect of the first embodiment, since a configuration is made in which the server device 10A includes the determination unit 11 and the setting unit 12, the user moves to the predetermined area while carrying the terminal device 20A, whereby it is possible to set a game content with a higher difficulty level in an executable state. Accordingly, the user moves toward the predetermined area so as to be able to play the game content with a higher difficulty level. With this, a play frequency of the user is maintained with an increase in the number of game contents to be played, and it is possible to give the user motivation to visit the same area of the real space any number of times.

In the example of the above-described embodiment, while the server device includes the determination unit and the setting unit, the terminal device may include the whole or a part of the determination unit and the setting unit. For example, in a case of a configuration in which the terminal device includes the whole of the determination unit and the setting unit, the terminal device may acquire the positional information of the predetermined area from the server device and store the positional information of the predetermined area in the storage unit. The terminal device may also acquire user data (the setting information of the game content) from the server device and store user data in the storage unit.

In the game system of the example of the above-described embodiment, while the server device controls the progress of the game, the embodiment is not particularly limited thereto. For example, a game system not including a server device may be provided. In this case, the terminal device included in the game system includes at least a determination unit, a setting unit, and an acquisition unit, and controls the progress of the game while executing the game in stand-alone.

Figure 5:
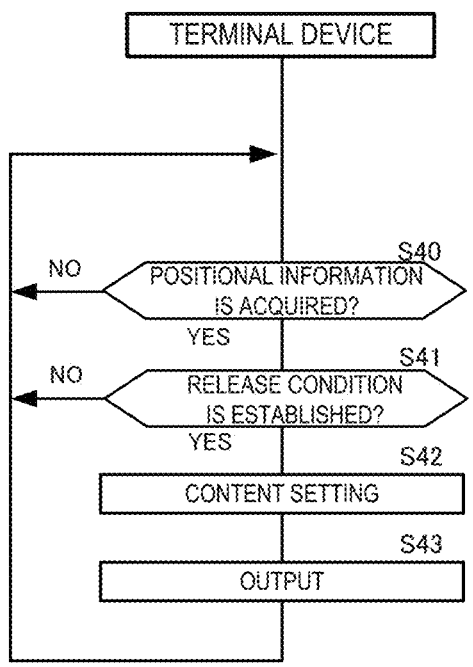
FIG. 5 is a flowchart showing an example of an operation of a terminal device in a case where a terminal device corresponding to at least one of the embodiments of the invention executes progress processing of a game.

FIG. 5 is a flowchart showing an example of the operation of the terminal device in a case where the progress processing of the game shown in FIG. 2 is executed in the game system not including a server device.

In the progress processing, the terminal device determines whether or not the positional information of the real space is acquired (Step S40). In a case where the positional information is not acquired (Step S30: NO), the terminal device 20 returns to the processing of Step S40. In a case where the positional information is acquired (Step S40: YES), the terminal device determines whether or not the release condition including the positional condition is established (Step S41).

In a case where the release condition is not established (Step S41: NO), the terminal device returns to the processing of Step S40. In a case where the release condition is established (Step S41: YES), the terminal device executes the content setting processing (Step S42). Specifically, the terminal device sets a game content with a difficulty level higher than a game content already set in an executable state among a plurality of game contents in an executable state for the user who uses the terminal device. For example, the terminal device performs the setting to user data of the user.

Thereafter, the terminal device displays a game image based on the setting information of the game content on the display unit (Step S43). For example, the game image is displayed such that the user can specify a game content executable at present. Thereafter, the terminal device returns to the processing of Step S40.

It should be noted that the "game content" described above means an element related to the game, such as a game stage on which the user plays or a virtual mission (quest) to be attained in a predetermined game space. In a rhythm game that plays music and displays an indication sign that urges the operation input on the display unit of the terminal device, a musical piece also corresponds to a game content. In addition, in a game that progresses a scenario constituted of a plurality of parts, each part also corresponds to a game content.

The "difficulty level" described above is an index of difficulty in clearing a game content. That is, the difficulty level is an index of difficulty in reaching a clear condition (end condition) determined in the game content. A case where a boss character to be an enemy becomes unable to fight a battle corresponds to the clear condition. Alternatively, a case where a predetermined game result (for example, a score, evaluation, or the like) is obtained with a play also corresponds to the clear condition.

The "predetermined area" described above is not particularly limited as long as the predetermined area is on the real space. For example, a store, such as a restaurant in one section on a predetermined floor of a building, a park, or the like corresponds to the predetermined area. The "predetermined area" may not be constantly the same area or may be changed at regular intervals.

In regard to the "positional information of the real space" described above, various kinds of information can be applied as long as information can specify the position of the real space of the terminal device. For example, there is positional information acquired using a global positioning system (GPS). For example, there is positional information acquired using a beacon technique with Bluetooth (Registered Trademark) Low Energy (BLE). In this case, for example, the terminal device acquires identification information (ID) broadcasted from a beacon transmitter that is disposed in a real store or the like. The real store where the beacon transmitter is disposed can be specified from the identification information. That is, the identification information corresponds to the positional information of the real space of the terminal device. The beacon technique is a general configuration, and thus, detailed description will be omitted. In regard to an acquisition method of the positional information of the real space, various techniques can be applied as long as a configuration is made in which the positional information can be acquired as in the above-described example.

The "release condition" described above is not limited only to the positional condition, and other conditions may be included in the release condition as long as at least the positional condition is included. For example, in a case where the predetermined area is a real store, a condition that a correct password that can be secured in the real store is included may be included in the release condition. In this case, for example, the user may secure the password by purchasing a commodity in the real store. Then, the user inputs the password to the terminal device, and the terminal device transmits the positional information and the password to the server device.

In the example of the above-described embodiment, while a configuration is made in which a game content is set in an executable state in units of the user who uses the terminal device, the embodiment is not particularly limited thereto. For example, a configuration may be made in which a game content is set in an executable state in units of the terminal device, instead of the user. That is, even though the user who uses the terminal device is changed, the state of the game content for the terminal device is not changed. In this case, the game content may be set in an executable state in association with the identification information of the terminal device.

While the positional condition of the example of the above-described embodiment includes that the terminal device is positioned in any predetermined area, the embodiment is not particularly limited thereto. For example, a condition that the terminal device has been positioned in the predetermined area in the past may be defined as a positional condition. In this case, the terminal device may store the positional information of the real space at regular intervals, and may transmit the positional information of the real space to the server device at a predetermined timing (for example, once a day). Then, the server device may set the executable state of the game content based on the received positional information. It should be noted that the terminal device may delete the positional information of the storage unit after transmitting the positional information to the server device.

In the example of the above-described embodiment, while the game content with a difficulty level higher than the game content already set in the executable state is set in the executable state, any game content may be set in the executable state as long as a difficulty level is high. The number of game contents that are set in the executable state at one time can be set arbitrarily.

Second Embodiment

Figure 6:
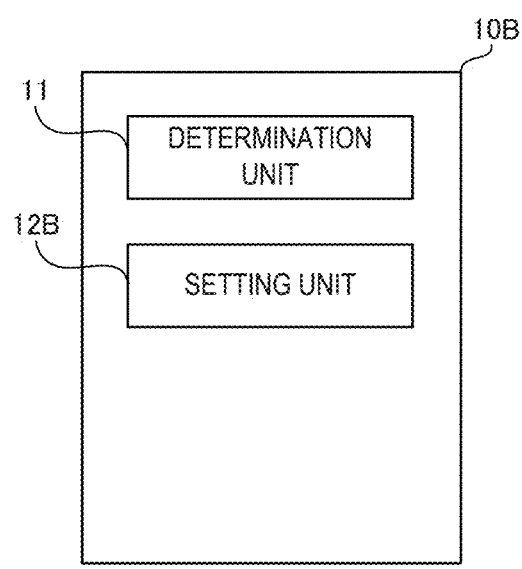
FIG. 6 is a functional block diagram showing an example of the configuration of a server device corresponding to at least one of the embodiments of the invention.

In an example of the embodiment, a system 100B that is an example of the system 100 will be described. The system 100B is constituted of a server device 10B, terminal devices 20B and 201B to 20NB, and the like. FIG. 6 is a block diagram showing the configuration of the server device 10B that is an example of the server device 10. In the example of the embodiment, the server device 10B includes at least a determination unit 11 and a setting unit 12B.

The determination unit 11 acquires positional information of a real space of the terminal devices 20B and 201B to 20NB from the terminal devices 20B and 201B to 20NB used by the users. The determination unit 11 determines establishment of a positional condition for each of the terminal devices 20B and 201B to 20NB based on the positional information of the real space.

The setting unit 12B sets a game content with a difficulty level higher than a game content already set in an executable state among the plurality of game contents in an executable state for the user who satisfies the release condition. In the example of the embodiment, the setting unit 12B sets a game content with a higher difficulty level next to a game content already in an executable state among a plurality of game contents in an executable state each time the release condition for each user is established. Accordingly, the user repeatedly satisfies the release condition, the game contents are gradually set in the executable state in an ascending order of the difficulty level. The setting unit 12B may perform the setting to user data including information relating to the game of the user, for example. User data may be stored in the storage unit of the server device 10B for each user, for example.

Figure 7:
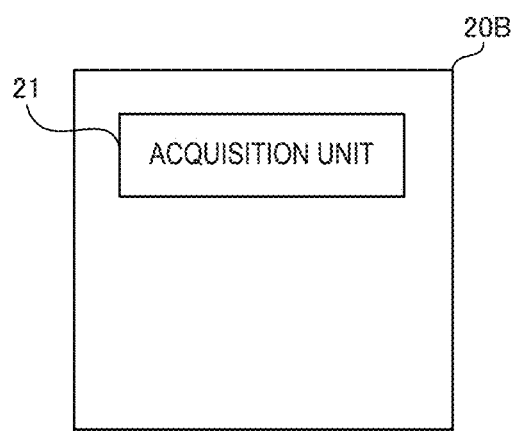
FIG. 7 is a functional block diagram showing an example of the configuration of a terminal device corresponding to at least one of the embodiments of the invention.

FIG. 7 is a block diagram showing the configuration of the terminal device 20B that is an example of the terminal device 20. In the example of the embodiment, the terminal device 20B includes at least an acquisition unit 21. It should be noted that the terminal devices 201B to 20NB also have the same configuration. The acquisition unit 21 acquires the positional information of the real space of the terminal device 20B.

Next, the operation of the system 100B will be described.

Figure 8:
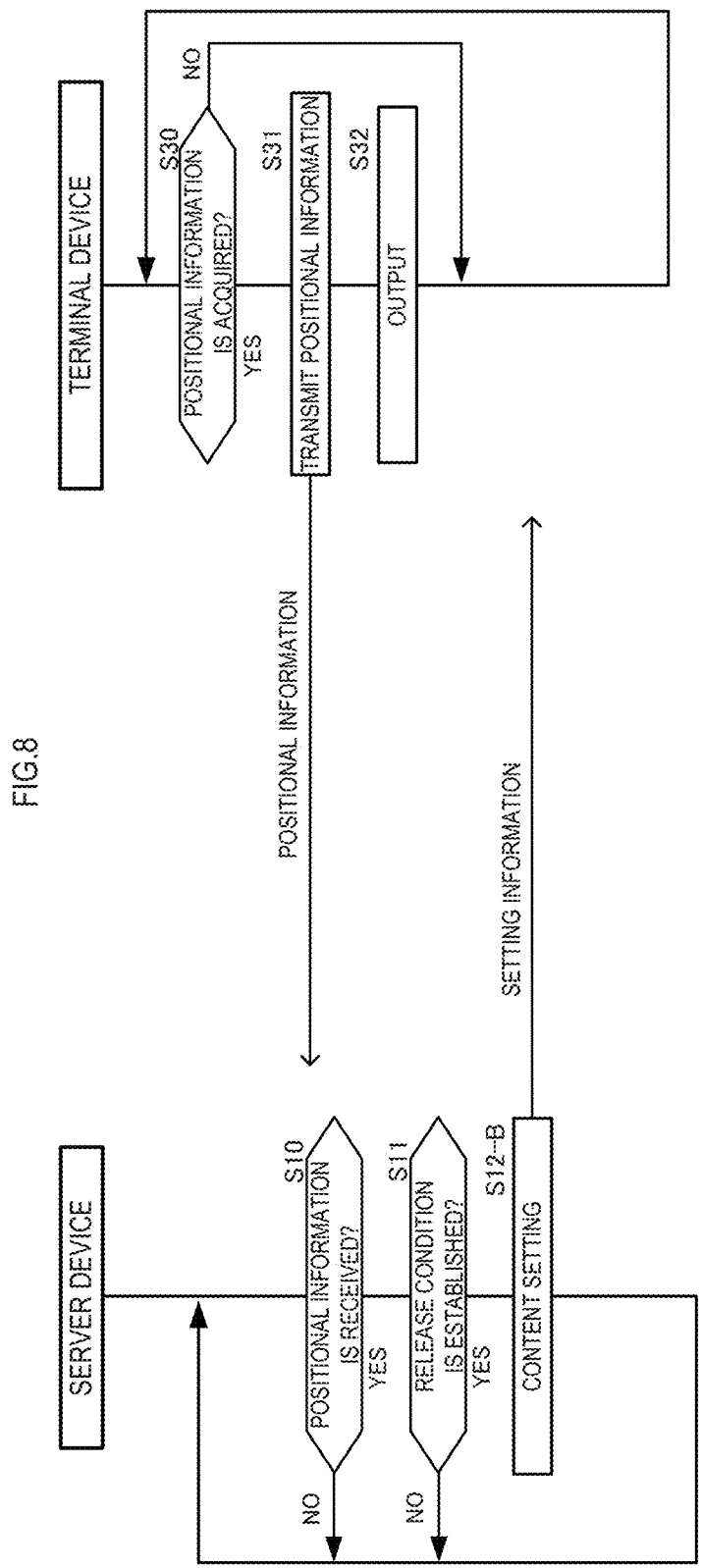
FIG. 8 is a flowchart showing an example of progress processing of a game corresponding to at least one of the embodiments of the invention.

FIG. 8 is a flowchart showing an example of progress processing of a game that the system 100B executes. In the progress processing in the example of the embodiment, processing for progressing the game including processing for setting a game content in an executable state is executed. Hereinafter, a case where the server device 10B and the terminal device 20B execute the progress processing will be described as an example. It should be noted that, in FIG. 8, processing for setting a game content in an executable state will be primarily described, and a part of other processing will be omitted. Description of a flowchart showing an operation of a terminal device in a system not having a server device will be omitted from a viewpoint of preventing redundant description.

The progress processing of the example of the embodiment is executed, for example, during starting of the server device 10B and the terminal device 20B.

In the progress processing, the terminal device 20B determines whether or not the positional information of the real space is acquired (Step S30). In a case where the positional information is not acquired (Step S30: NO), the terminal device 20B returns to the processing of Step S30. In a case where the positional information is acquired (Step S30: YES), the terminal device 20B transmits the acquired positional information to the server device 10B (Step S31). It should be noted that the terminal device 20B also transmits the identification information (user ID) of the user along with the acquired positional information.

The server device 10B determines whether or not the positional information of the real space is received (Step S10). In a case where the positional information is not received (Step S10: NO), the server device 10B returns to the processing of Step S10 again.

In a case where the positional information of the real space is received (Step S10: YES), the server device 10B determines whether or not the release condition is established (Step S11). In a case where the release condition is not established (Step S11: NO), the server device 10B returns to the processing of Step S10. In a case where the release condition is established (Step S11: YES), the server device 10B executes the content setting processing (Step S12-B). Specifically, the server device 10B sets a game content with a higher difficulty level next to a game content already set in an executable state among a plurality of game contents in an executable state for the user who uses the terminal device 20B. The server device 10B performs the setting to user data of the user as described above. It should be noted that, in a case where there are a plurality of game contents with the next higher difficulty level, for example, all of a plurality of game contents may be set in an executable state.

The server device 10B transmits the setting information of the game content set in the executable state to the terminal device 20B. The terminal device 20B displays a game image based on the setting information of the game content received from the server device 10B on the display unit (Step S32). Thereafter, the terminal device 20B returns to the processing of Step S30.

As described above, as an aspect of the second embodiment, since a configuration is made in which the server device 10B includes the determination unit 11 and the setting unit 12B, the user moves to the predetermined area while carrying the terminal device 20B, whereby it is possible to set a game content with a higher difficulty level in an executable state. Accordingly, the user moves toward the predetermined area so as to be able to play the game content with a higher difficulty level. With this, a play frequency of the user is maintained with an increase in the number of game contents to be played, and it is possible to give the user motivation to visit the same area of the real space any number of times.

In the example of the above-described embodiment, while a configuration is made in which a game content is set in an executable state in units of the user who uses the terminal device, the embodiment is not particularly limited thereto. For example, a configuration may be made in which a game content is set in an executable state in units of the terminal device, instead of the user.

While the positional condition of the example of the above-described embodiment includes that the terminal device is positioned in any predetermined area, the embodiment is not particularly limited thereto. For example, a condition that the terminal device has been positioned in the predetermined area in the past may be defined as a positional condition.

Third Embodiment

Figure 9:
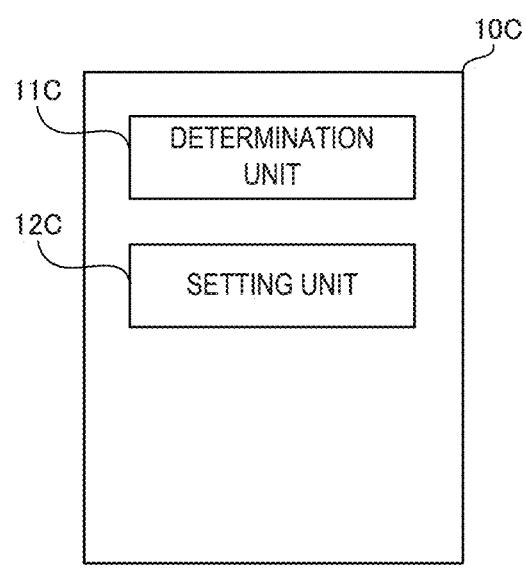
FIG. 9 is a functional block diagram showing an example of the configuration of a server device corresponding to at least one of the embodiments of the invention.

In an example of the embodiment, a system 100C that is an example of the system 100 will be described. The system 100C is constituted of a server device 10C, terminal devices 20C and 201C to 20NC, and the like. FIG. 9 is a block diagram showing the configuration of the server device 10C that is an example of the server device 10. In the example of the embodiment, the server device 10C includes at least a determination unit 11C and a setting unit 12C.

The determination unit 11C acquires positional information of a real space of the terminal devices 20C and 201C to 20NC from the terminal devices 20C and 201C to 20NC used by the users. The determination unit 11C determines establishment of a positional condition for each of the terminal devices 20C and 201C to 20NC based on the positional information of the real space. In the example of the embodiment, the determination unit 11C determines the establishment of the positional condition for a predetermined area not set as an exclusion target among one or more predetermined areas. An exclusion target is set and cancelled by the setting unit 12C.

The setting unit 12C sets a game content with a difficulty level higher than a game content already set in an executable state among the plurality of game contents in an executable state for the user who satisfies the release condition.

In a case where the positional condition is established, the setting unit 12C sets the predetermined area determined under the positional condition as an exclusion target. The setting unit 12C performs the setting to user data including information relating to the game of the user, for example. User data may be stored in the storage unit of the server device 100 for each user.

In a case where a predetermined area that is set as an exclusion target satisfies a cancel condition, the setting unit 12C cancels the predetermined area from an exclusion target. The "cancel condition" described above can be set arbitrarily. For example, change of a real date set as an exclusion target to the next day may be defined as a cancel condition. In this case, the establishment of the positional condition in one predetermined area is only once a day in the real space. That is, even though the user frequently visits the same predetermined area for a short period, the number of game contents to be set in an executable state is not increased. Accordingly, the user is given motivation to visit another predetermined area that is not set as an exclusion target.

It should be noted that setting and cancel of an exclusion target may be performed for user data. Specifically, setting and cancel (erasure) of identification information of a predetermined area as an exclusion target may be performed for user data. In this case, in a case where change of a real date set as an exclusion target to the next day is defined as a cancel condition, the identification information of a predetermined area as an exclusion target may be set in association with information of the set date.

Figure 10:
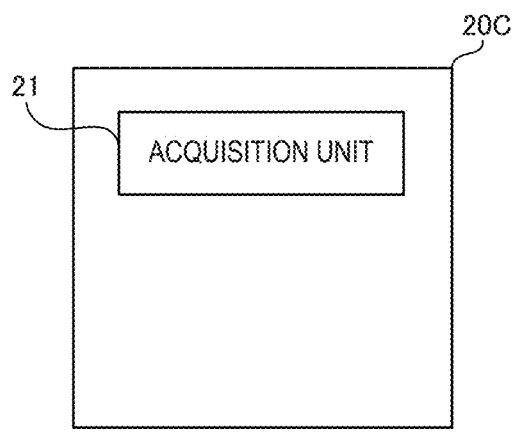
FIG. 10 is a functional block diagram showing an example of the configuration of a terminal device corresponding to at least one of the embodiments of the invention.

FIG. 10 is a block diagram showing the configuration of the terminal device 20C that is an example of the terminal device 20. In the example of the embodiment, the terminal device 20C includes at least an acquisition unit 21. It should be noted that the terminal devices 201C to 20NC also have the same configuration. The acquisition unit 21 acquires the positional information of the real space of the terminal device 20C.

Next, the operation of the system 100C will be described.

Figure 11:
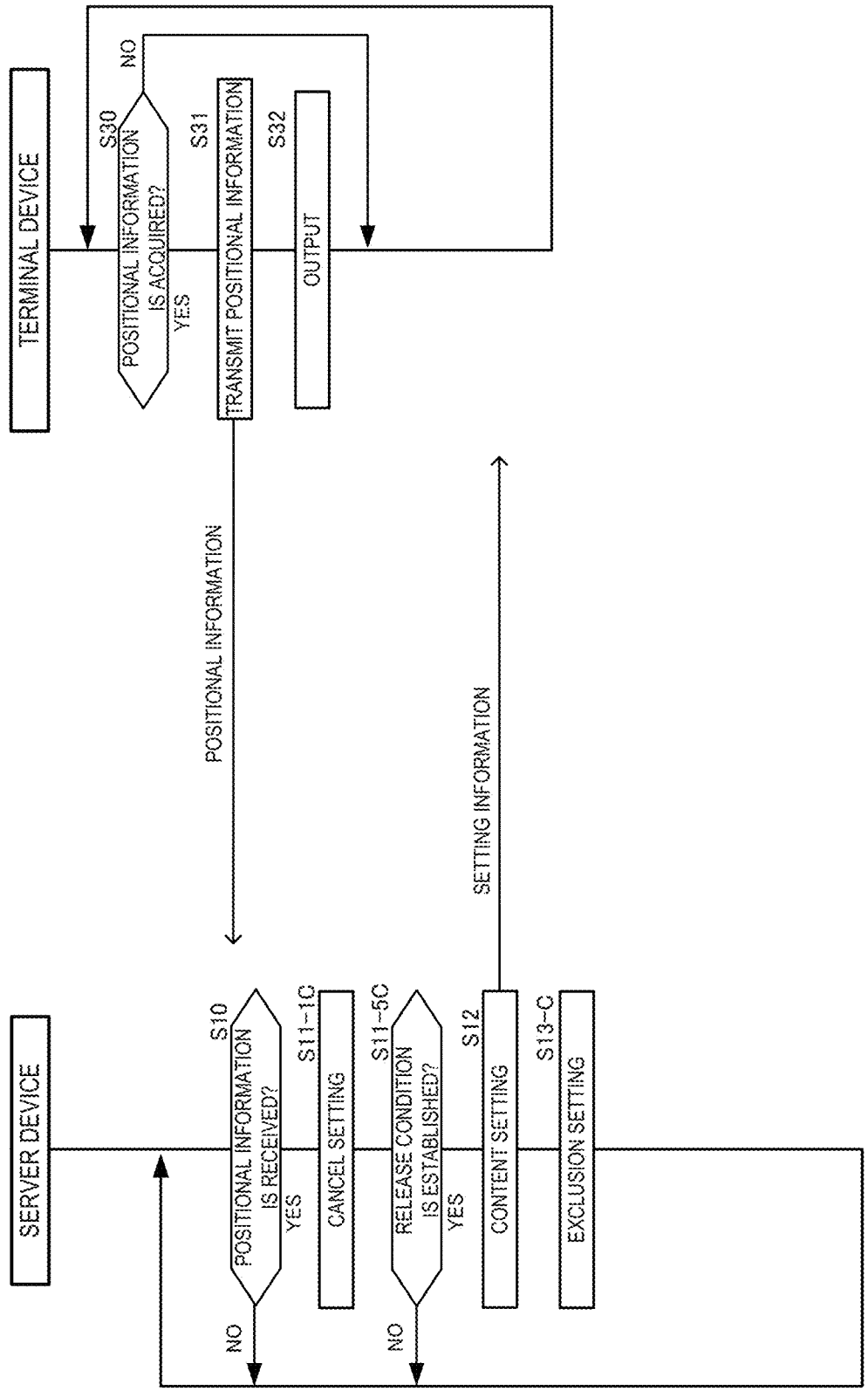
FIG. 11 is a flowchart showing an example of progress processing of a game corresponding to at least one of the embodiments of the invention.

FIG. 11 is a flowchart showing an example of progress processing of a game that the system 100C executes. In the progress processing in the example of the embodiment, processing for progressing a game including processing for setting a game content in an executable state is executed. Hereinafter, a case where the server device 10C and the terminal device 20C execute the progress processing will be described as an example. It should be noted that, in FIG. 11, processing for setting a game content in an executable state will be primarily described, and a part of other processing will be omitted. Description of a flowchart showing an operation of a terminal device in a system not having a server device will be omitted from a viewpoint of preventing redundant description.

The progress processing of the example of the embodiment is executed, for example, during starting of the server device 100 and the terminal device 20C.

In the progress processing, the terminal device 20C determines whether or not the positional information of the real space is acquired (Step S30). In a case where the positional information is not acquired (Step S30: NO), the terminal device 20C returns to the processing of Step S30. In a case where the positional information is acquired (Step S30: YES), the terminal device 20C transmits the acquired positional information to the server device 10C (Step S31). It should be noted that the terminal device 20C also transmits the identification information (user ID) of the user along with the acquired positional information.

The server device 10C determines whether or not the positional information of the real space is received (Step S10). In a case where the positional information is not received (Step S10: NO), the server device 10C returns to the processing of Step S10 again.

In a case where the positional information of the real space is received (Step S10: YES), the server device 10C performs cancel setting processing of an exclusion target (Step S11-1C). In the cancel setting processing, the server device 10C determines whether or not each predetermined area set as an exclusion target satisfies the cancel condition. Then, the server device 10C cancels the predetermined area satisfying the cancel condition from an exclusion target. For example, the server device 10C performs cancel setting for user data of the user of the terminal device 20C.

Next, the server device 10C determines whether or not a release condition including a positional condition is established (Step S11-5C). In the example of the embodiment, the establishment of the positional condition is determined as a target for a predetermined area not set as an exclusion target among one or more predetermined areas. In a case where the release condition is not established (Step S11-5C: NO), the server device 10C returns to the processing of Step S10.

In a case where the release condition is established (Step S11-5C: YES), the server device 10C performs the content setting processing (Step S12). Specifically, the server device 10C sets a game content with a difficulty level higher than a game content already set in an executable state among a plurality of game contents in an executable state for the user who uses the terminal device 20C. The server device 10C performs the setting for user data of the user as described above. The server device 10C transmits the setting information of the game content set in the executable state to the terminal device 20C. The terminal device 20C displays a game image based on the setting information of the game content received from the server device 10C on the display unit (Step S32). Thereafter, the terminal device 20C returns to the processing of Step S30.

Next, the server device 10C performs exclusion setting processing (Step S13-C). Specifically, the server device 10C sets a predetermined area under the positional condition determined to be established in the processing of Step S11-5C as an exclusion target. The server device 10C performs the setting for user data of the user as described above. Thereafter, the server device 10C returns to the processing of Step S10.

As described above, as an aspect of the third embodiment, since a configuration is made in which the server device 10C includes the determination unit 11C and the setting unit 12C, the user moves to the predetermined area while carrying the terminal device 20C, whereby it is possible to set a game content with a higher difficulty level in an executable state. Accordingly, the user moves toward the predetermined area so as to be able to play the game content with a higher difficulty level. With this, a play frequency of the user is maintained with an increase in the number of game contents to be played, and it is possible to give the user motivation to visit the same area of the real space any number of times.

Since the predetermined area in a case where the positional condition is established is set as an exclusion target, even the predetermined area set as an exclusion target is visited frequently, the number of game contents to be set in an executable state is not increased. Accordingly, the user is given motivation to visit another predetermined area not set as an exclusion target.

In the example of the above-described embodiment, while a configuration is made in which a game content is set in an executable state in units of the user who uses the terminal device, the embodiment is not particularly limited thereto. For example, a configuration may be made in which a game content is set in an executable state in units of the terminal device, instead of the user. The setting of an exclusion target may be performed in units of the terminal device similarly to a configuration in which a game content is set in an executable state.

While the positional condition of the example of the above-described embodiment includes that the terminal device is positioned in any predetermined area, the embodiment is not particularly limited thereto. For example, a condition that the terminal device has been positioned in the predetermined area in the past may be defined as a positional condition.

Fourth Embodiment

Figure 12:
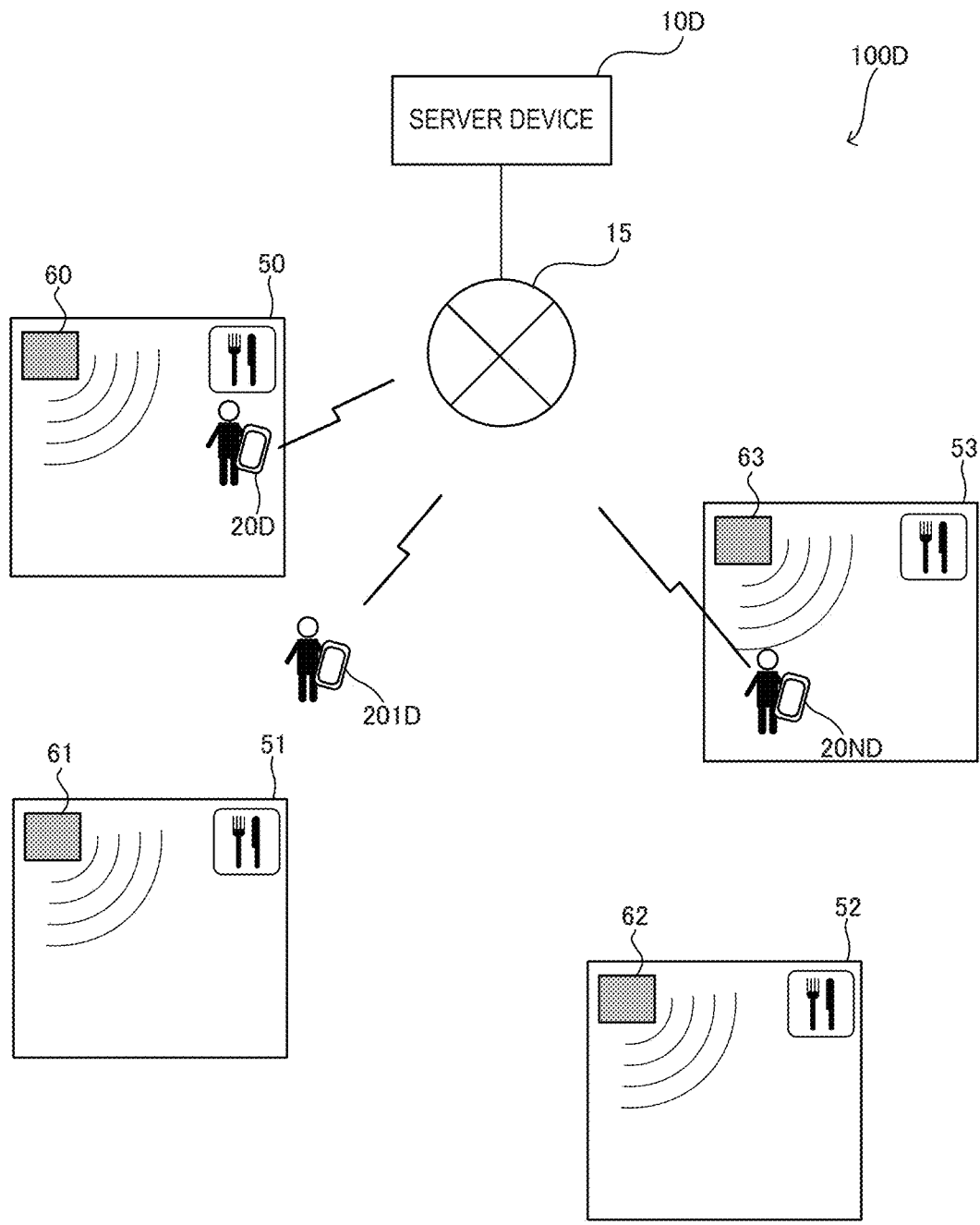
FIG. 12 is a block diagram showing an example of the configuration of a game system corresponding to at least one of the embodiments of the invention.

FIG. 12 is a block diagram showing the configuration of a system 100D that is an example of the configuration of the system 100. The system 100D includes a server device 10D and a plurality of terminal devices 20D and 201D to 20ND (where N is any integer). The server device 10D and a plurality of terminal devices 20D and 201D to 20ND used by a plurality of users (players) who play the game are connected to a communication network 15, such as the Internet, in a wireless manner.

The system 100D of the example of the embodiment has various functions that execute a so-called gourmet action game where a user becomes a clerk of a virtual restaurant of a game space and provides a dish to a customer. The system 100D has various functions that execute a bingo game (video game) as a sub-game in addition to the gourmet action game to be a main game.

First, the main game will be described. In the main game, the sales amount secured by providing dishes to customers in a virtual store becomes the score of the user. That is, when dishes can be appropriately provided to more customers, the score increases.

Figure 13:
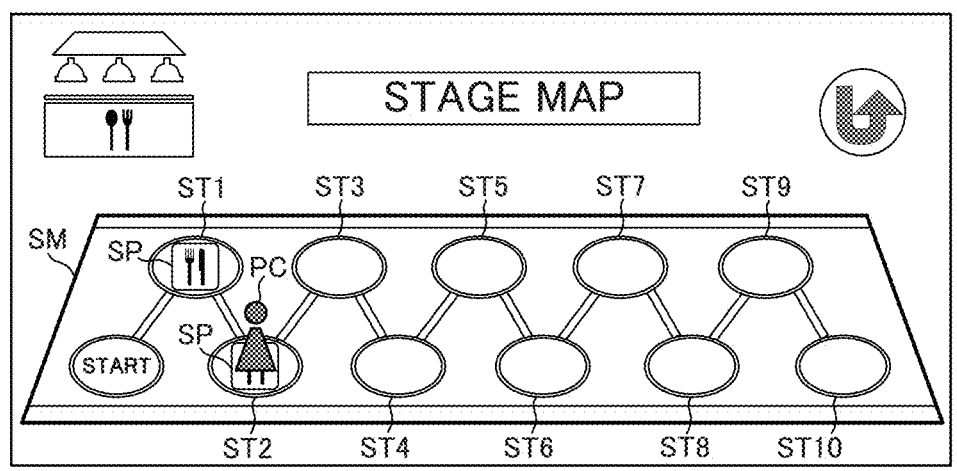
FIG. 13 is a diagram showing an example of a game image corresponding to at least one of the embodiments of the invention.

In the main game of the example of the embodiment, a plurality of cooking stages (stages) ST1 to ST10 in a virtual restaurant are provided to the user. The stage ST1 becomes the stage of start (First stage), and the stage ST10 becomes the stage of goal (Final stage). The progress of the stages of the user is visually recognized with a stage map SM shown in FIG. 13. FIG. 13 shows an example of a game image showing the stage map SM of the virtual restaurant. In the stage map SM, circular areas indicating the stages ST1 to ST10 are connected from "START" by line segments. A character PC on the stage map SM is disposed in a circular area of a higher-order stage already cleared by the user. FIG. 13 shows a state in which the stage ST2 is cleared.

Each of the stages ST1 to ST10 is a game content where a dish is provided to a customer in a virtual restaurant. The stages ST1 to ST10 are different in the number of customers who come to the store, the number of kinds of dishes to be provided to the customers, or the like. In a case where the score (game result) secured in a play of one stage is equal to or greater than a clear score, the user clears the stage. The clear score is different for each of the stages ST1 to ST10. In the example of the embodiment, the greater the stage number, the higher the clear score is set. The clear score of each of the stages ST1 to ST10 is included in game data.

The stages ST1 to ST10 are different in difficulty level according to the number of customers, the number of kinds of dishes, the clear score, or the like as described. The greater the stage number, the higher the difficulty level is set. That is, the difficulty level of the stage ST1 is the lowest, and the difficulty level of the stage ST10 is the highest.

As described above, while the user plays in order from the stage ST1 toward the stage ST10, in a case where one stage is not cleared, the user cannot play the next stage. For example, in a case where the stage ST3 is not cleared, the user cannot play the next stage ST4. It should be noted that the user can play the stage already cleared any number of times. For example, the user selects a circular area of a stage to play on the stage map SM, whereby a play in the stage is started.

However, a target playable by the user is limited to an unlocked stage among the stages ST1 to ST10. That is, the target is limited to a stage set in an executable state. Accordingly, for example, even though the stage ST3 is cleared, in a case where the stage ST4 is locked, the user cannot play the stage ST4.

The user can visually recognize whether or not each of the stages ST1 to ST10 is locked from the stage map SM shown in FIG. 13. Specifically, a stage where a stamp SP is displayed in a circular area indicates a stage in an unlocked state. That is, a stage with the stamp SP is in an executable state. For example, in the stage map SM shown in FIG. 13, the stamp SP is displayed in the circular areas of the stages ST1 and ST2. Accordingly, while the stage ST2 is unlocked, since the next stage ST3 is locked, the user cannot play the stage ST3.

In a case where the release condition is established, a stage with a higher difficulty level next to a stage already unlocked is unlocked. That is, a stage with a higher difficulty level next to a stage already set in an executable state is set in an executable state. In the example of the embodiment, only the positional condition is included as the release condition. The positional condition is that the terminal devices 20D and 201D to 20ND used by the users are positioned in any of real stores 50 to 53 (predetermined areas) shown in FIG. 12. The real stores 50 to 53 are stores that exist in the real space. For example, the real stores 50 to 53 are a plurality of stores that are managed by one restaurant. Accordingly, in unlocking, the users should visit the real stores 50 to 53 while carrying the terminal devices 20D and 201D to 20ND.

For example, in a case where the users who use the terminal device 20D visit the three stores 50 to 52, the users can newly secure three stamps SP. With this, in a case of the stage map SM shown in FIG. 13, the stamp SP is newly displayed in the circular areas of the stages ST3 to ST5. That is, the stages ST3 to ST5 are newly unlocked.

In the example of the embodiment, determination is made whether or not the terminal devices 20D and 201D to 20ND are positioned in the real stores 50 to 53 applying a beacon technique with Bluetooth (Registered Trademark) Low Energy (BLE).

As shown in FIG. 12, beacon transmitters 60 to 63 are provided in the stores 50 to 53, respectively. The beacon transmitters 60 to 63 broadcast identification information. In the identification information, identification information of a store where the beacon transmitter is provided is included. The identification information of the store corresponds to the positional information of the real space of the terminal devices 20D and 201D to 20ND. It should be noted that information broadcasted from the beacon transmitters 60 to 63 is set in advance. The beacon technique with Bluetooth (Registered Trademark) Low Energy (BLE) is a general configuration, and thus, detailed description will be omitted.

In a case where the identification information broadcasted from the beacon transmitters 60 to 63 is acquired, the terminal devices 20D and 201D to 20ND transmit the identification information of the stores to the server device 10D. The server device 10D determines the establishment of positional condition (release condition) from the transmitted identification information of the stores.

It should be noted that, in the example of the embodiment, while unlocking is made (stamp SP is provided) each time the user visits one store among the four stores 50 to 53, a visit to the same store is valid only once a day. That is, unlocking through a visit to the same store is made only once a day in the real. For example, even though the user who uses the terminal device 20D visits the store 50 three times a day, since only one stamp SP can be secured, only one stage is unlocked.

In the main game, in a case where the user clears all stages ST1 to ST10, a privilege relating to the real stores 50 to 53 (predetermined areas) is provided to the user. The privilege is, for example, a right (lottery right) of a coupon lottery that a real coupon (gift certificate) is presented to a user who wins in the coupon lottery. A user with no lottery right is not subjected to a coupon lottery. A real coupon can be used for eating in the real stores 50 to 52. It should be noted that any privilege may be applied as the above-described privilege as long as the privilege relates to the real stores 50 to 53 (predetermined areas).

In the main game, while all stages ST1 to ST10 are unlocked when the ten stamps SP are secured, the user further continuously visits the real stores 50 to 53, whereby more stamps SP can be secured. Then, in a case where the number of secured stamps SP reaches a predetermined number (for example, 100), at least one of the privilege relating to the real stores 50 to 53 (predetermined areas) and a privilege relating to the main game is provided to the user. The privilege relating to the main game means a privilege for allowing the user to progress the game advantageously. In the example of the embodiment, the privilege relating to the real stores 50 to 53 and the privilege relating to the main game are provided. As the privilege relating to the real stores 50 to 53 (predetermined areas), the above-described lottery right is provided. Accordingly, chance for the user to secure the lottery right of the coupon is increased. As the privilege relating to the main game, an item that generates an effect of increasing a score in a play of each of the stages ST1 to ST10 is provided.

Next, the bingo game that is a sub-game will be described referring to FIG. 14A to 14E. In the bingo game, five virtual bingo cards B1 to B5 are used. The bingo cards B1 to B5 are provided to the users (the terminal devices 20D and 201D to 20ND) one by one. In the example of the embodiment, in a case where the users (the terminal devices 20D and 201D to 20ND) visit the real stores 50 to 53, the stamp SP is provided, and a bingo lottery is executed once. Specifically, the bingo lottery is executed once in a case where the above-described positional condition is established.

The bingo cards B1 to B4 have numbers set in vertical 5×horizontal 5 grids (however, a central grid is a free spot). The number of each grid is set randomly, for example. The bingo cards B1 to B4 are different in background color, and for example, have background colors of red, blue, yellow, and green. The bingo card B5 has commodities set in vertical 5×horizontal 5 grids (however, a central grid is a free spot). The commodities are commodities that are provided in the real stores 50 to 53. A grid marked with a number (a commodity) selected in a bingo lottery, becomes a valid grid. It should be noted that the number selected in the bingo lottery is a number common to the bingo cards B1 to B4. The bingo game is intended to arrange any of a vertical line, a horizontal line, and a diagonal line with valid grids.

The bingo lottery is executed by the server device 10D. The bingo lottery includes a first lottery, a second lottery, and a third lottery. The first lottery is a lottery that selects one number from among numbers of 0 to 99. The second lottery is a lottery that determines whether or not to perform a commodity selection lottery (third lottery). The third lottery is a lottery that selects one commodity from among 100 kinds of commodities. The third lottery is executed only in a case where execution is determined in the second lottery. Accordingly, in a single bingo lottery, while one number is necessarily selected, a commodity may not be selected.

Figure 14A:
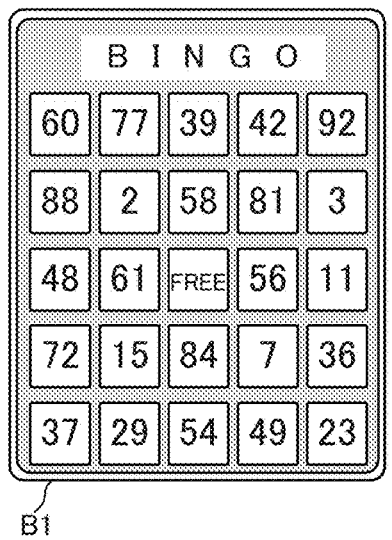
FIG. 14A to 14E are a diagram showing an example of a game image corresponding to at least one of the embodiments of the invention.
Figure 14B:
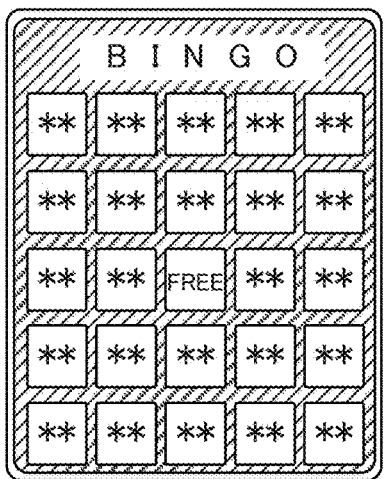
Figure 14C:
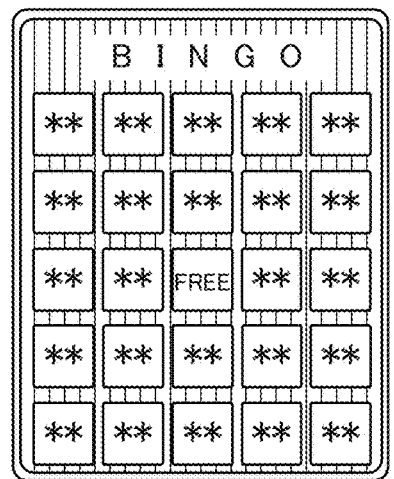
Figure 14D:
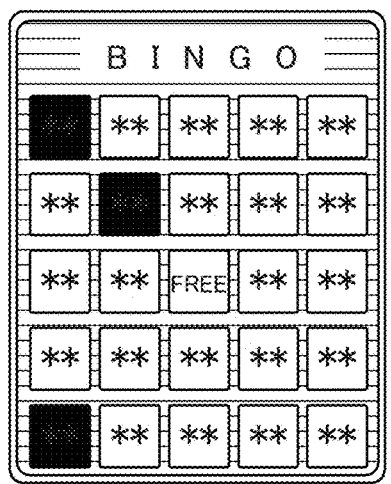
Figure 14E:
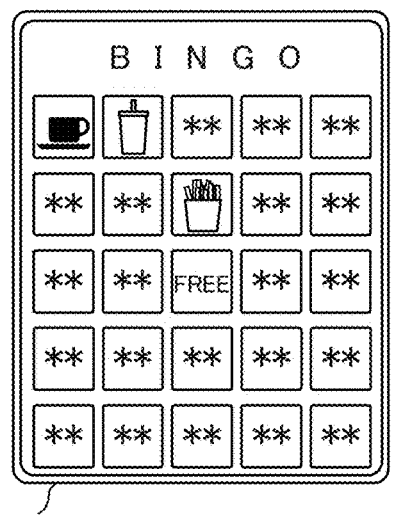

The terminal devices 20D and 201D to 20ND update the display of the bingo cards B1 to B5 according to a result of the bingo lottery. For example, as shown in FIG. 14D, a grid (valid grid) of each of the bingo cards B1 to B4 corresponding to the number selected in the bingo lottery is displayed in black. A grid (valid grid) of the bingo card B5 corresponding to the commodity selected in the bingo lottery is displayed in black.

In any of the bingo cards B1 to B4, each time any of a vertical line, a horizontal line, and a diagonal line is arranged with valid grids, the privilege relating to the main game is provided to the user. In a case where a special condition is established, at least one of the privilege relating to the real stores 50 to 53 (predetermined areas) and the privilege relating to the main game is provided to the user. In the example of the embodiment, in a case where the special condition is established, the above-described lottery right is provided to the user.

The special condition is, for example, that any of "red card completed", "one or more lines arranged in cards of all colors", and "10 lines in total arranged" is established. "Red card completed" means a state in which all grids of the bingo card B1 become valid grids. "One or more lines arranged in cards of all colors" means a state in which one or more lines of valid grids are arranged in each of the bingo cards B1 to B4. "10 lines in total arranged" means a state in which 10 or more lines of valid grids are arranged in the bingo cards B1 to B4.

In the bingo card B5, each time any of a vertical line, a horizontal line, and a diagonal line is arranged with valid grids, the privilege relating to the real stores 50 to 53 (predetermined areas) is provided to the user. In the example of the embodiment, the above-described lottery right is provided.

In a case where all lines of the bingo cards B1 to B4 are arranged, the bingo cards B1 to B4 are erased (reset), and new bingo cards B1 to B4 are provided to the users. The bingo card B5 is erased (reset) when the privilege is provided, and a new bingo card B5 is provided to the user. It should be noted that the timing of erasure of each of the bingo cards B1 to B5 can be set arbitrarily. The number of kinds of bingo cards may be one or more.

Returning to FIG. 12, the server device 10D is managed by the administrator of the game system and has various functions for providing information relating to the progress of the game to the terminal devices 20D and 201D to 20ND. In the example of the embodiment, the server device 10D provides setting information of execution permission or prohibition of the game content for the user, information relating to the result of the bingo lottery, and the like. In the example of the embodiment, the server device 10D is constituted of an information processing device, such as a WWW server, in order to provide information relating to the progress of the video game, and includes a database that stores various kinds of information, such as user data of each user relating to the game. It should be noted that game data is also included in the game program.

Figure 15:
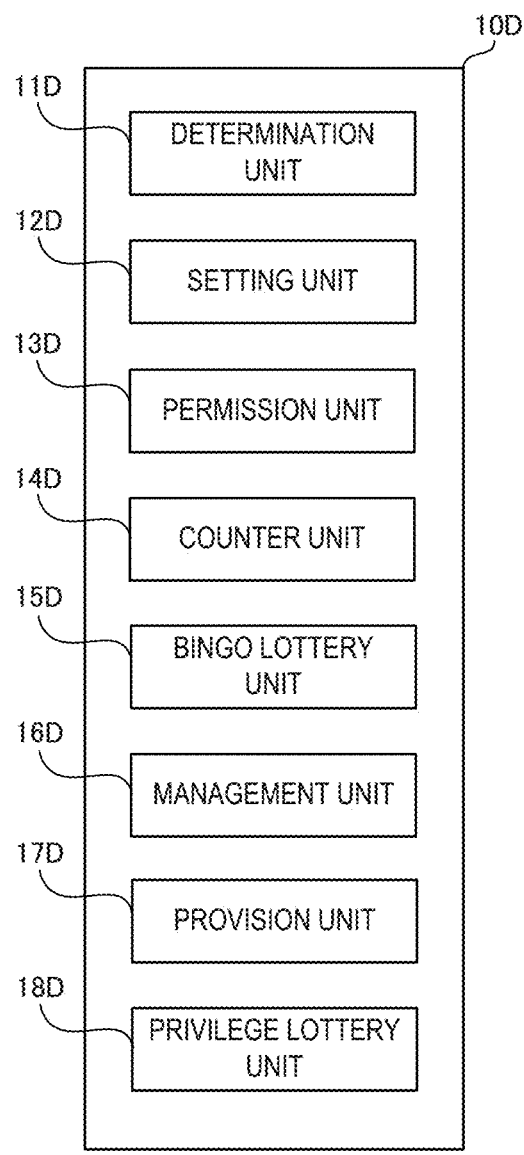
FIG. 15 is a functional block diagram showing an example of the configuration of a server device corresponding to at least one of the embodiments of the invention.

FIG. 15 is a functional block diagram showing the configuration of the server device 10D that is an example of the configuration of the server device 10. While server device 10D includes a storage unit, such as an HDD, a control unit constituted of a CPU, and the like (not shown), detailed description will be omitted. The server device 10D includes at least a determination unit 11D, a setting unit 12D, a permission unit 13D, a counter unit 14D, a bingo lottery unit 15D, a management unit 16D, a provision unit 17D, and a privilege lottery unit 18D when the control unit executes software (game program) for controlling the progress of the video game stored in the storage unit.

The determination unit 11D acquires the positional information (the identification information of the stores) of the real space of the terminal devices 20D and 201D to 20ND from the terminal devices 20D and 201D to 20ND used by the users. The determination unit 11D determines the establishment of the positional condition for each of the terminal devices 20D and 201D to 20ND based on the positional information of the real space. It should be noted that, in the example of the embodiment, the determination unit 11D determines the positional condition for a real store not set as an exclusion target among one or more real stores 50 to 53 (predetermined areas). The exclusion target is set and cancelled by the setting unit 12D. It should be noted that the identification information of the stores is stored in the storage unit of the server device 10D.

The setting unit 12D sets (unlocks) a game content with a higher difficulty level next to a game content already set in an executable state among the plurality of game contents (stages ST1 to ST10) in an executable state for the user who satisfies the release condition. As described above, each time the release condition is established, the stages are set in the executable state stage by stage in order from the stage ST1.

The setting unit 12D sets the identification information of the stage in the executable state in user data shown in FIG. 17. User data is stored in the database of the server device 10D for each user. FIG. 17 is a diagram showing an example of user data.

In a case where the positional condition is established, the setting unit 12D sets a real store determined under the positional condition as an exclusion target. That is, the setting unit 12D sets the identification information of the real store as an exclusion target for user data. In a case where the real store set as an exclusion target satisfies the cancel condition, the setting unit 12D cancels the real store from an exclusion target. That is, the setting unit 12D cancels (erases) the identification information of the real store set as an exclusion target for user data. The cancel condition is that a real date set as an exclusion target is changed to the next day.

Next, user data will be described. User data is data relating to the video game of the user. As shown in FIG. 17, user data is constituted of fields of user ID, user name, owned item, number of stamps, executable stage, clear stage, exclusion target, bingo data, secured privilege, and the like. In the field of the user ID, the user ID that is the identification information of the user is set. Each user ID is associated with the user name, the owned item, the number of stamps, the executable stage, the clear stage, the exclusion target, bingo data, the secured privilege, and the like.

In the field of the user name, the name of the user in the game, for example, text data is set. In the field of the owned item, identification information of an item usable in the game by the user (user ID) is set.

In the field of the number of stamps, the number or stamps (total value) secured by the user (user ID) is set. In the field of the executable stage, identification information of a stage in an executable state of the user (user ID) is set. In the field of the clear stage, identification information of a stage cleared by the user (user ID) is set.

In the field of the exclusion target, identification information of a real store as an exclusion target is set. In the field of bingo data, information relating to the bingo game is set. For example, information of the numbers or the like associated with the grids of the bingo cards B1 to B5, and information of a lottery result, arrangement stage of lines, and the like are set.

In the field of the secured privilege, information of a privilege relating to a real store provided to the user (user ID) is set. For example, identification information of a lottery right is set along with a secured real date.

Next, returning to FIG. 15, the permission unit 13D permits a play until a game content with a higher difficulty level next to a game content where a predetermined game result is obtained with a play among the stages (game contents) in the executable state. In the example of the embodiment, the permission unit 13D permits a play until a stage with a higher difficulty level next to a cleared stage among the stages in the executable state. The permission unit 13D sets the identification information of the cleared stage to the clear stage of user data based on a game result.

The counter unit 14D counts the number of times the release condition is established. That is, the number of stamps SP secured by the user is counted. The counter unit 14D increases the number of stamps of user data of the user (user ID) by one each time the release condition is established.

The bingo lottery unit 15D executes the above-described bingo lottery for the user who satisfies the positional condition. The management unit 16D manages the bingo cards B1 to B5 of the users (user IDs). Specifically, the management unit 16D performs provision of the bingo cards B1 to B5, specification of the arrangement states of the vertical, horizontal, and diagonal lines of the bingo cards B1 to B5, and the like. The management unit 16D updates bingo data of user data based on a result of the bingo lottery.

The provision unit 17D provides various privileges described above to the users based on the number of stamps, the states of the stages ST1 to ST10, and the arrangement states of the lines of the bingo cards B1 to B5. The provision unit 17D sets each privilege in user data of the user (user ID) who is provided with the privilege. For example, in a case where an item is provided, identification information of an item is additionally set in the owned item of user data. In a case where a lottery right is provided, identification information of a lottery right is additionally set in the secured privilege of user data.

The privilege lottery unit 18D executes the above-described coupon lottery for a user who owns a lottery right. The coupon lottery is repeatedly executed, for example, at each predetermined timing, such as the end of the month in the real. The privilege lottery unit 18D specifies users (user ID) who have a lottery right as a lottery target with reference to user data of the users at a timing when a lottery is executed. Next, the privilege lottery unit 18D randomly selects a predetermined number of users from among the specified users (user IDs). Then, a gift certificate is presented to the selected users. The privilege lottery unit 18D erases the lottery right of the user (user ID) to be a lottery target from the secured privilege of user data. That is, only a single coupon lottery is executed with one lottery right. In a case where the user has a plurality of lottery rights, for example, one lottery right may be erased in a single coupon lottery.

While only a single coupon lottery is executed with one lottery right, a lottery may be executed until the coupon lottery is won. In this case, when the coupon lottery is won, a lottery right may be deleted. Delivery of a coupon when the coupon lottery is won can be set arbitrarily. For example, an address of a destination of a gift certificate should be sent from the user who wins in the coupon lottery.

Next, the terminal devices 20D and 201D to 20ND will be described. A plurality of terminal devices 20D and 201D to 20ND is managed by the users who play the games. The terminal devices 20D and 201D to 20ND are smartphones in which the video game can be executed.

While each of the terminal devices 20D and 201D to 201ND includes a plurality of operation devices (operation units), a storage unit, such as an HDD, a control unit constituted of a CPU that executes the game to generate a game image, a display device (display unit) that displays the game image, a transmission and reception unit that performs communication with other devices, and the like, detailed description will be omitted. In the terminal devices 20D and 201D to 20ND, software (game program) for executing the video game by performing communication with the server device 10D is stored in the storage unit.

Figure 16:
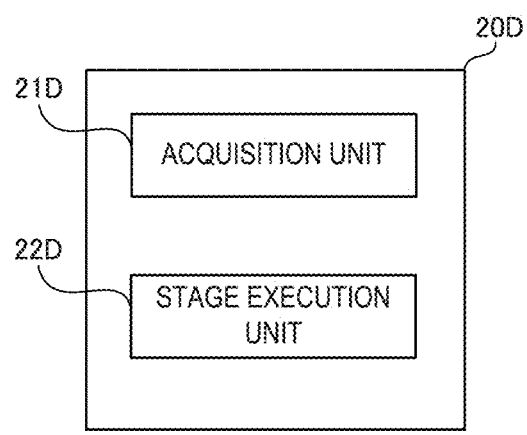
FIG. 16 is a functional block diagram showing an example of the configuration of a terminal device corresponding to at least one of the embodiments of the invention.

FIG. 16 is a functional block diagram showing the configuration of the terminal device 20D that is an example of the configuration of the terminal device 20. The terminal device 20D includes at least an acquisition unit 21D and a stage execution unit 22D, for example, when the control unit executes the game program. It should be noted that the terminal devices 201D to 20ND also have the same configuration.

The acquisition unit 21D acquires the positional information of the real space of the terminal device 20D. Specifically, the acquisition unit 21D acquires the identification information of the real store as the positional information of the real space from the beacon transmitter 60. The stage execution unit 22D determines whether or not a stage that the user requests to play is playable with reference to the executable stage and the clear stage of user data. In a case where the stage that the user requests to play is playable, the stage execution unit 22D starts the execution of the stage. Then, the stage execution unit 22D transmits a game result of the played stage to the server device 10D. The server device 10D that receives the game result updates user data of the clear stage and the like.

Next, the operation of the system 100D of the embodiment will be described.

Figure 18:
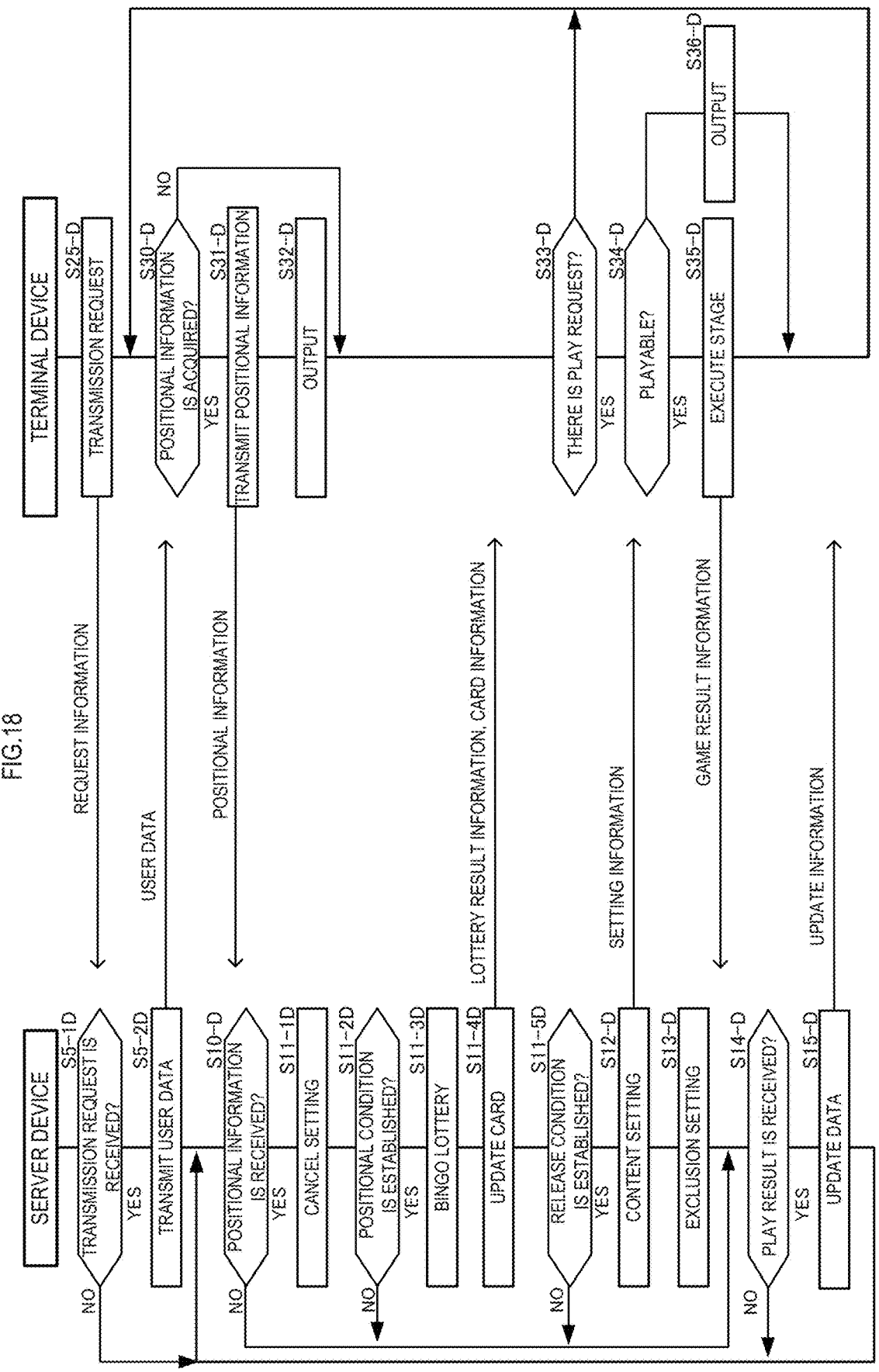
FIG. 18 is a flowchart showing an example of progress processing of a game corresponding to at least one of the embodiments of the invention.

FIG. 18 is a flowchart showing an example of progress processing of a game that the system 100D executes. In the progress processing in the example of the embodiment, processing for progressing the game including processing for setting a game content in an executable state and processing for progressing the bingo game is executed. Hereinafter, a case where the server device 10D and the terminal device 20D execute the progress processing will be described as an example. It should be noted that, in FIG. 18, processing for setting a game content in an executable state and processing for progressing the bingo game will be primarily described, and a part of other processing will be omitted. Description of a flowchart showing an operation of a terminal device in a system not having a server device will be omitted from a viewpoint of preventing redundant description.

The progress processing of the example of the embodiment is executed, for example, during starting of the server device 10D and the terminal device 20D.

In the progress processing, the terminal device 20D transmits a transmission request of user data including the user ID (Step S25-D). The server device 10D determines whether or not the transmission request is received (Step S5-1D). In a case where the transmission request is not received (Step S5-1D: NO), the server device 10D progresses to processing of Step S10-D. In a case where the transmission request is received (Step S5-1D: YES), the server device 10D transmits user data corresponding to the user ID included in the transmission request to the terminal device 20D (Step S5-2D).

The terminal device 20D determines whether or not the positional information is acquired (Step S30-D). The terminal device 20D determines that the positional information is acquired in a case where the identification information is received from the beacon transmitters 60 to 63. In a case where the positional information is not acquired (Step S30-D: NO), the terminal device 20D progresses to processing of Step S33-D. In a case where the positional information is acquired (Step S30-D: YES), the terminal device 20D transmits the acquired positional information to the server device 10D (Step S31-D). Specifically, the terminal device 20D transmits the identification information of the real store received from the beacon transmitters 60 to 63 to the server device 10D along with the user ID.

Thereafter, the terminal device 20D displays a game image (FIG. 13, 14, or the like) based on information of a game content (stage), information of the number of stamps, and information relating to the bingo game received from the server device 10D on the display unit (Step S32-D). Though not shown, the terminal device 20D updates (synchronizes) user data stored in the terminal device 20D based on information received from the server device 10D.

The server device 10D determines whether or not the positional information is received in the processing of Step S10-D. In a case where the positional information is not received (Step S10-D: NO), the server device 10D progresses to processing of Step S14-D. In a case where the positional information is received (Step S10-D: YES), the server device 10D performs the cancel setting processing of an exclusion target (Step S11-1D). In the cancel setting processing, the server device 10D determines whether or not each predetermined area (real store) set as an exclusion target satisfies the cancel condition. Then, the server device 10D cancels a predetermined area satisfying the cancel condition from an exclusion target. That is, cancel setting is performed for the exclusion target (user data) of the user. As described above, a real store that is set as an exclusion target the day before in the real space is cancelled from an exclusion target.

Next, the server device 10D determines whether or not the positional condition is established (Step S11-2D). The server device 10D performs determination by comparison of the identification information of the real stores 50 to 53 stored in the storage unit with the identification information of the store received from the terminal device 20D. In the example of the embodiment, the establishment of the positional condition is determined for a real store not set as an exclusion target among the real stores 50 to 53.

In a case where determination is made that the positional condition is not established (Step S11-2D: NO), the server device 10D progresses to the processing of Step S14-D. In a case where determination is made that the positional condition is established (Step S11-2D: YES), the server device 10D executes bingo lottery processing (Step S11-3D). In the bingo lottery processing, as described above, the first lottery, the second lottery, and the third lottery of the bingo game are executed.

Thereafter, the server device 10D executes card update processing (Step S11-4D). In the card update processing, bingo data (user data) of the user is updated based on a lottery result in the bingo lottery processing. In the card update processing, a privilege is provided according to the arrangement states of the lines of valid grids of each of the bingo cards B1 to B5. As described above, user data is updated according to the provided privilege. Thereafter, the server device 10D transmits information updated in the card update processing to the terminal device 20D. Specifically, the lottery result in the bingo lottery, the image information of the bingo cards B1 to B5, and the like are transmitted.

Next, the server device 10D determines whether or not the release condition is established (Step S11-5D). It should be noted that, in the processing of Step S11-5D, since the establishment of the positional condition is determined in the processing of Step S11-1D, the establishment of the release condition excluding the positional condition is determined. In a case where the release condition is not established (Step S11-5D: NO), the server device 10D progresses to the processing of Step S14-D.

In a case where the release condition is established (Step S11-5D: YES), the server device 10D performs the content setting processing (Step S12-D). Specifically, a stage with a higher difficulty level next to a stage already set in an executable state among a plurality of stages ST1 to ST10 is set in an executable state for the user who uses the terminal device 20D. That is, the identification information of the stage to be executable is added to the executable stage (user data) of the user. The server device 10D also executes provision processing of a stamp in the content setting processing. That is, the number of stamps (user data) of the user increases by one. Thereafter, the server device 10D transmits information of the stage set in the executable state, the number of stamps, and the like to the terminal device 20D.

The server device 10D provides a privilege according to the number of stamps secured by the user in the content setting processing. As described above, user data (the secured privilege, or the like) is updated according to the provided privilege.

Next, the server device 10D executes the exclusion setting processing (Step S13-D). Specifically, the server device 10D sets the predetermined area (real store) under the positional condition determined to be established in the processing of Step S11-2D as an exclusion target. That is, the identification information of the real store is set in the exclusion target (user data) of the user.

Next, the server device 10D determines whether or not a play result is received from the terminal device 20D (Step S14-D). In a case where the play result is not received (Step S14-D: NO), the server device 10D returns to the processing of Step S5-1D. In a case where the play result is received (Step S14-D: YES), the server device 10D updates user data based on a clear condition, the play result, and the like (Step S15-D). That is, the identification information of the stage cleared by the user is added to the clear stage (user data) of the user. Thereafter, the server device 10D transmits update information, such as the clear stage, to the terminal device 20D.

The terminal device 20D determines the presence or absence of a play request from the user in processing of Step S33-D. For example, a case where the user operates the operation unit of the terminal device 20D to select a stage corresponds to the play request. In a case where there is no play request (Step S33-D: NO), the terminal device 20D returns to the processing of Step S30-D.

In a case where there is the play request (Step S33-D: YES), the terminal device 20D determines whether or not the selected stage is playable (Step S34-D). Specifically, in a case where the selected stage is in the executable state, and a stage with a lower difficulty level next to the selected stage is cleared, the terminal device 20D determines that the selected stage is playable. It should be noted that the terminal device 20D may perform determination with reference to the executable stage and the clear stage of user data.

In a case where determination is made that the selected stage is playable (Step S34-D: YES), the terminal device 20D executes the selected stage (Step S35-D). The terminal device 20D transmits a play result of the selected stage to the server device 10D along with the user ID at the time of the end of the play. In a case where determination is made that the selected stage is not playable (Step S34-D: NO), the terminal device 20D displays, on the display unit, an image indicating that the selected stage is not playable (Step S36-D). Thereafter, the terminal device 20D returns to the processing of Step S30-D.

As described above, as an aspect of the fourth embodiment, since a configuration is made in which the server device 10D includes the determination unit 11D, the setting unit 12D, and the provision unit 17D, the user moves to the predetermined area (real store) while carrying the terminal device 20D, whereby it is possible to set a game content (stage) with a higher difficulty level in an executable state. Accordingly, the user moves toward the predetermined area so as to be able to play the game content with a higher difficulty level. With this, a play frequency of the user is maintained with an increase in the number of game contents to be played, and it is possible to give the user motivation to visit the same area of the real space any number of times.

Since the predetermined area (real store) in a case where the positional condition is established is set as an exclusion target, even though the predetermined area set as an exclusion target is visited frequency, the number of game contents to be set in an executable state is not increased. Accordingly, the user is given motivation to visit another predetermined area not set as an exclusion target.

Since the privilege relating to the real store is provided to the user when a predetermined stage is cleared while unlocking a stage, the play frequency of the user is also maintained, and the user can be given motivation to visit even the same area of the real space any number of times.

In addition to unlocking of a stage, since provision of a stamp and a lottery of a bingo game are performed according to a visit to a predetermined area (real store), the user can be given motivation to visit the same area of the real space any number of times.

In the example of the above-described embodiment, while the server device manages user data in the database, the embodiment is not particularly limited thereto. For example, user data of the user may be stored (managed) in the storage unit of the terminal device used by the user. In this case, user data may be suitably transmitted from the terminal device to the server device.

In the example of the above-described embodiment, while a configuration is made in which a game content with a difficulty level higher than a game content already set in an executable state is set in an executable state for the user who uses the terminal device, the embodiment is not particularly limited thereto. For example, a configuration may be made in which the setting is performed for the terminal device, instead of the user. In this case, a game content may be set in an executable state in association with the identification information of the terminal device. The setting of an exclusion target may be the same as in a configuration in which a game content is set in an executable state.

In the example of the above-described embodiment, while the positional condition includes that the terminal device is positioned in the predetermined area, the embodiment is not particularly limited thereto. For example, the positional condition may include that the terminal device has been positioned in the predetermined area in the past.

In the example of the above-described embodiment, while the ten stages have been described, the number of game contents can be set arbitrarily.

In the example of the above-described embodiment, while a stage that is set in an executable state with the establishment of the release condition including the positional condition has been described, the establishment of the release condition may not be needed for all stages. In the example of the above-described embodiment, while only the positional condition is included as the release condition, the embodiment is not particularly limited thereto.

In the example of the above-described embodiment, while the positional condition for starting the bingo lottery is the same as the positional condition included in the release condition of the stage, the positional information may not be the same. For example, the predetermined area (real store) where the bingo lottery is executed may be set to be different from the predetermined area (real store) of the positional condition included in the release condition of the stage. For example, in a case where the user (terminal device) visits any real store, the bingo lottery is executed. Then, in a case where the user (terminal device) visits a real store different from any real store, the stage is set in the executable state. In the example of the above-described embodiment, while a configuration is made in which the bingo game is executed, the bingo game may not be executed.

In the above-described embodiment, while the bingo cards are provided to the users without any conditions, a condition may be set. For example, a configuration may be made in which the bingo cards are provided in a case where the above-described positional condition is established.

In the example of the above-described embodiment, while various privileges are provided to the users, the provided privileges may be the same privilege or may be different privileges.

In the example of the above-described embodiment, while the lottery right is provided to the users as the privilege relating to the real store, the embodiment is not particularly limited thereto. For example, an electronic coupon may be provided to the users as the privilege relating to the real store. In this case, image information of the electronic coupon may be set as the secured privilege (user data), and the user may be made to perform an operation to make the electronic coupon be displayed on the terminal device.

In the example of the above-described embodiment, while the positional information is acquired using the beacon technique with Bluetooth (Registered Trademark) Low Energy (BLE), as an acquisition method of the positional information, various techniques can be applied. For example, the positional information of the real space may be acquired using a global positioning system (GPS). In this case, when the user (terminal device) visits the predetermined area (real store), the user performs an acquisition operation to make the terminal device acquire the positional information of the real space. Then, the acquired positional information may be transmitted from the terminal device to the server device.

In the example of the above-described embodiment, even though a stage is in an executable state, in a case where a stage with a difficulty level lower than the stage is not cleared, a play is not permitted; however, the embodiment is not particularly limited thereto. A stage in an executable stage may be permitted regardless of a clear situation.

APPENDIX

In the above description, the embodiments have been described such that at least the following inventions can be realized by those skilled in the art.

[1]

A game program that makes a server device connected to a terminal device executing a game including a plurality of game contents with different difficulty levels through a communication network control progress of the game, the game program causing the server device to realize:

a determination function of determining, based on positional information of a real space of the terminal device acquired from the terminal device used by a user, establishment of a positional condition including that the terminal device is positioned or has been positioned in any of one or more predetermined areas; and a setting function of setting a game content with a difficulty level higher than a game content already set in an executable state in the terminal device or the user among the plurality of game contents in an executable state based on establishment of a release condition including the positional condition.

[2]

The game program according to [1], in which, in the setting function, a function of setting a game content with a higher difficulty level next to a game content already set in an executable state in the terminal device or the user among the plurality of game contents in an executable state each time the release condition is established is realized.

[3]

The game program according to [1] or [2], in which, in the determination function, a function of determining establishment of the positional condition for a predetermined area not set as an exclusion target among the one or more predetermined areas is realized, and in the setting function, a function of, in a case where the positional condition is established, setting a predetermined area determined under the positional condition as an exclusion target, and in a case where a cancel condition is established, cancelling the predetermined area from an exclusion target is realized.

[4]

The game program according to any one of [1] to [3], causing the server device to further realize:

a permission function of permitting a play until a game content with a higher difficulty level next to a game content having a predetermined game result obtained with a play among the game contents in the executable state.

[5]

The game program according to any one of [1] to [4], causing the server device to further realize:

a provision function of providing a privilege relating to the predetermined area in a case where a predetermined game result is obtained with a play of a game content with the highest difficulty level among the plurality of game contents.

[6]

The game program according to any one of [1] to [5], in which the predetermined area is a store in the real space, and the positional information of the real space of the terminal device is acquired by the terminal device from a beacon transmitter of the store.

[7]

The game program according to [5], causing the server device to further realize:

a counter function of counting the number of times of establishment of the release condition, in which, in the provision function, a function of providing at least one of a privilege relating to the predetermined area and a privilege relating to the game in a case where the number of times of establishment reaches a predetermined number greater than the number of the plurality of game contents is realized.

[8]

A server device that is connected to a terminal device executing a game including a plurality of game contents with different difficulty levels through a communication network, and controls progress of the game, the server device including:

a determiner configured to determine, based on positional information of a real space of the terminal device acquired from the terminal device used by a user, establishment of a positional condition including that the terminal device is positioned or has been positioned in any of one or more predetermined areas; and a setter configured to set a game content with a difficulty level higher than a game content already set in an executable state in the terminal device or the user among the plurality of game contents in an executable state based on establishment of a release condition including the positional condition.

[9]

A game program that makes a terminal device control progress of a game including a plurality of game contents with different difficulty levels, the game program causing the terminal device to realize:

an acquisition function of acquiring positional information of a real space;

a determination function of determining, based on the positional information of the real space, establishment of a positional condition including that the terminal device is positioned or has been positioned in any of one or more predetermined areas; and a setting function of setting a game content with a difficulty level higher than a game content already set in an executable state among the plurality of game contents in an executable state based on establishment of a release condition including the positional condition.

[10]

The game program according to [9], in which, in the setting function, a function of setting a game content with a higher difficulty level next to the game content in the executable state among the plurality of game contents in an executable state each time the release condition is established.

[11]

The game program according to [9] or [10], in which, in the determination function, a function of determining establishment of the positional condition for a predetermined area not set as an exclusion target among the one or more predetermined areas is realized, and in the setting function, a function of, in a case where the positional condition is established setting a predetermined area determined under the positional condition as an exclusion target, and in a case where a cancel condition is established, cancelling the predetermined area from an exclusion target is realized.

[12]

The game program according to any of [9] to [11], causing the terminal device to further realize:

a permission function of permitting the user to play until a game content with a higher difficulty level next to a game content having a predetermined game result obtained with a play among the game contents in the executable state.

[13]

The game program according to any one of [9] to [12], causing the terminal device to further realize:

a provision function of providing a privilege relating to the predetermined area in a case where a predetermined game result is obtained with a play of a game content with the highest difficulty level among the plurality of game contents.

[14]

The game program according to any one of [9] to [13], in which the predetermined area is a store in the real space, and the positional information of the real space is calculated based on a signal from a beacon transmitter of the store.

[15]

The game program according to [14], causing the terminal device to further realize:

a counter function of counting the number of times of establishment of the release condition, in which, in the provision function, a function of providing at least one of a privilege relating to the predetermined area and a privilege relating to the game in a case where the number of times of establishment reaches a predetermined number greater than the number of the plurality of game contents is realized.

[16]

A terminal device that controls process of a game including a plurality of game contents with different difficulty levels, the terminal device including:

an acquirer configured to acquire positional information of a real space;

a determiner configured to determine, based on the positional information of the real space, establishment of a positional condition including that the terminal device is positioned or has been positioned in any of one or more predetermined areas; and a setter configured to set a game content with a difficulty level higher than a game content already set in an executable state among the plurality of game contents in an executable state based on establishment of a release condition including the positional condition.

[17]

A game system that includes a terminal device executing a game including a plurality of game contents with different difficulty levels and a server device connected to the terminal device through a communication network, and controls progress of the game, the game system including:

an acquirer configured to acquire positional information of a real space of the terminal device used by the user;

a determiner configured to determine, based on the positional information of the real space, establishment of a positional condition including that the terminal device is positioned or has been positioned in any of one or more predetermined areas; and a setter configured to set a game content with a difficulty level higher than a game content already set in an executable state in the terminal device or the user among the plurality of game contents in an executable state based on establishment of a release condition including the positional condition.

[18]

The game system according to [17], in which the setter sets a game content with a higher difficulty level next to a game content already set in an executable state in the terminal device or the user among the plurality of game contents in an executable state each time the release condition is established.

[19]

The game system according to [17] or [18], in which the determiner determines establishment of the positional condition as a target for a predetermined area not set as an exclusion target among the one or more predetermined areas, and in a case where the positional condition is established, the setter sets a predetermined area determined under the positional condition as an exclusion target, and in a case where a cancel condition is established, the setter cancels the predetermined area from an exclusion target.

[20]

The game system according to any one of [17] to [19], further including:

a permitter configured to permit a play until a game content with a higher difficulty level next to a game content having a predetermined game result obtained with a play among the game contents in the executable state,

[21]

The game system according to any one of [17] to [20], further including:

a provider configured to provide a privilege relating to the predetermined area in a case where a predetermined game result is obtained with a play of a game content with the highest difficulty level among the plurality of game contents.

[22]

The game system according to any one of [17] to [21], in which the predetermined area is a store in the real space, and the positional information of the real space of the terminal device is acquired by the terminal device from a beacon transmitter of the store.

[23]

The game system according to [21], further including:

a counter configured to count the number of times of establishment of the release condition, the provider provides at least one of a privilege relating to the predetermined area and a privilege relating to the game in a case where the number of times of establishment reaches a predetermined number greater than the number of the plurality of game contents.

[24]

A game progress control method that makes a server device connected to a terminal device executing a game including a plurality of game contents with different difficulty levels through a communication network control progress of the game, the game progress control method including:

a determination step of determining, based on positional information of a real space of the terminal device acquired from the terminal device used by a user, establishment of a positional condition including that the terminal device is positioned or has been positioned in any of one or more predetermined areas; and a setting step of setting a game content with a difficulty level higher than a game content already set in an executable state in the terminal device or the user among the plurality of game contents in an executable state based on establishment of a release condition including the positional condition.

[25]

A game progress control method that makes a game system including a terminal device executing a game including a plurality of game contents with different difficulty levels and a server device connected to the terminal device through a communication network control progress of the game, the game progress control method including:

an acquisition step of acquiring positional information of a real space of the terminal device;

a determination step of determining, based on the positional information of the real space, establishment of a positional condition including that the terminal device is positioned or has been positioned in any of one or more predetermined areas; and a setting step of setting a game content with a difficulty level higher than a game content already set in an executable state in the terminal device or the user among the plurality of game contents in an executable state based on establishment of a release condition including the positional condition.

According to one of the embodiments of the invention, it is useful for giving a user motivation to visit even the same area of a real space many times while maintaining a play frequency of the user.

What is claimed is:

1. A game program that makes a server device connected to a terminal device executing a game including a plurality of game contents with different difficulty levels through a communication network control progress of the game, the game program causing a processor of the server device to perform:

determining, based on positional information of a real space of the terminal device acquired from the terminal device used by a user, establishment of a positional condition including that the terminal device is positioned or has been positioned in any of one or more predetermined areas; and setting, from an unexecutable state to an executable state, a game content with a difficulty level higher than a game content that was already set in the executable state for the terminal device or the user among the plurality of game contents, the setting being performed based on establishment of a release condition that is determined based on a determined position of the terminal device, wherein, in the determining, determining of an establishment of the positional condition for a predetermined area not set as an exclusion target among the one or more predetermined areas is performed, and wherein, in the setting, in a case where the positional condition is established, setting a predetermined area determined under the positional condition as the exclusion target, and, in a case where a cancel condition is established, cancelling the predetermined area from the exclusion target is performed.

2. The game program according to claim 1, wherein the setting from the unexecutable state to the executable state includes setting the game content with the higher difficulty level next to the game content already set in the executable state for the terminal device or the user among the plurality of game contents in the executable state each time the release condition is established is performed.

3. The game program according to claim 1, causing the processor of the server device to further perform:

permitting a play until the game content with the higher difficulty level next to a game content having a predetermined game result is obtained with a play among the game contents in the executable state.

4. The game program according to claim 1, causing the processor of the server device to further perform:
providing a privilege relating to the predetermined area in a case where a predetermined game result is obtained with a play of a game content with highest difficulty level among the plurality of game contents.

5. The game program according to claim 4, causing the processor of the server device to further perform:
counting a number of times of establishment of the release condition,
wherein the providing of the privilege includes providing at least the privilege relating to the predetermined area and a privilege relating to the game in a case where the number of times of establishment reaches a predetermined number greater than a number of the plurality of game contents is performed.

6. The game program according to claim 1,
wherein the one or more predetermined areas include a store in the real space, and
the positional information of the real space of the terminal device is acquired by the terminal device from a beacon transmitter of the store.

7. The game program according to claim 1,
wherein a difficulty setting of the game is adjusted based on the determined positional information of the real space of the terminal device.

8. The game program according to claim 1,
wherein the setting from the unexecutable state to the executable state includes adjusting a difficulty of the game with respect to game conditions, and not with respect to virtual character attributes being controlled by the user.

9. The game program according to claim 8,
wherein the game conditions include at least a number of enemy characters and score required.

10. A game program that makes a terminal device control progress of a game including a plurality of game contents with different difficulty levels, the game program causing a processor of the terminal device to perform:
acquiring positional information of a real space;
based on the positional information of the real space, determining establishment of a positional condition including that the terminal device is positioned or has been positioned in any of one or more predetermined areas; and setting, from an unexecutable state to an executable state, a game content with a difficulty level higher than a game content that was already set in the executable state among the plurality of game contents, the setting being performed based on establishment of a release condition that is determined based on a determined position of the terminal device,
wherein, in the determining, determining of an establishment of the positional condition for a predetermined area not set as an exclusion target among the one or more predetermined areas is performed, and
wherein, in the setting, in a case where the positional condition is established, setting a predetermined area determined under the positional condition as the exclusion target, and, in a case where a cancel condition is established, cancelling the predetermined area from the exclusion target is performed.

11. A game system that includes a terminal device executing a game including a plurality of game contents with different difficulty levels and a server device connected to the terminal device through a communication network, and controls progress of the game, the game system comprising:
a processor configured to:
acquire positional information of a real space from the terminal device used by a user;
determine, based on the positional information of the real space, establishment of a positional condition including that the terminal device is positioned or has been positioned in any of one or more predetermined areas;
set, from an unexecutable state to an executable state, a game content with a difficulty level higher than a game content that was already set in the executable state for the terminal device or the user among the plurality of game contents, wherein the game content with the difficulty level higher is set in the executable state based on establishment of a release condition that is determined based on a determined position of the terminal device;
determine an establishment of the positional condition for a predetermined area not set as an exclusion target among the one or more predetermined areas is performed;
in a case where the positional condition is established, set a predetermined area determined under the positional condition as the exclusion target; and
in a case where a cancel condition is established, cancel the predetermined area from the exclusion target.

* * * * *